United States Patent [19]

Kuga et al.

[11] Patent Number: 5,276,616
[45] Date of Patent: Jan. 4, 1994

[54] APPARATUS FOR AUTOMATICALLY GENERATING INDEX

[75] Inventors: Shigeki Kuga, Nara; Hiroyuki Kanza, Kyoto; Naotoshi Maruyama, Nara, all of Japan

[73] Assignee: Sharp Kabushiki Kaisha, Osaka, Japan

[21] Appl. No.: 596,283

[22] Filed: Oct. 11, 1990

[30] Foreign Application Priority Data

Oct. 16, 1989 [JP] Japan .................................. 1-269553
Oct. 16, 1989 [JP] Japan .................................. 1-269554
Oct. 16, 1989 [JP] Japan .................................. 1-269555

[51] Int. Cl.⁵ .......................... G06F 15/38; G06F 1/00
[52] U.S. Cl. ....................... 364/419.08; 364/DIG. 1; 364/DIG. 2; 364/419.11
[58] Field of Search ............................... 364/419, 200

[56] References Cited

U.S. PATENT DOCUMENTS 4,580,218 4/1986 Raye ..................... 364/419
5,109,509 4/1992 Katayama et al. ................ 364/419

FOREIGN PATENT DOCUMENTS 0032194 7/1980 European Pat. Off. .
63-217418 10/1988 Japan .

OTHER PUBLICATIONS

Journal Of Documentation, vol. 39, No. 3, Sep. 1983 London GB, pp. 135-154, M. Dillon & L. K. McDonald.
Patent Abstracts Of Japan, vol. 12, No. 298, Aug. 15, 1988, p. 744 & JP-A-63 070 372, Canon Inc., Mar. 30, 1988.

Primary Examiner—Roy N. Envall, Jr.
Assistant Examiner—Frantzy Poinvil
Attorney, Agent, or Firm—Nixon & Vanderhye

[57] ABSTRACT

A system for creating an index of textual data stores textual data in memory, and a text analyzing module analyzes the textual data and divides it into a plurality of meaningful strings of characters, punctuation marks, symbols, control codes, etc. A dictionary stores sets of specialized words particular to a field of knowledge related to the textual data in a particular language. An entry selecting module selects as index entries only those strings which match one of those specialized words and notes the location(s) of each occurrence each index entry in the text. A printer outputs the selected index entries together with their occurrence positions. Each entry of the dictionary in the specialized field includes information concerning inflections and variants of that entry. The index is quickly and accurately generated by selecting index entries using a specialized dictionary relevant to a particular, specialized field. Since the selection of index entries is made by referring to such a dictionary, differences in criteria for selection used by different operators can be prevented. Since a specialized dictionary is prepared and updated for each field, the knowledge for generating an index is collected and shared by all the operators.

20 Claims, 18 Drawing Sheets

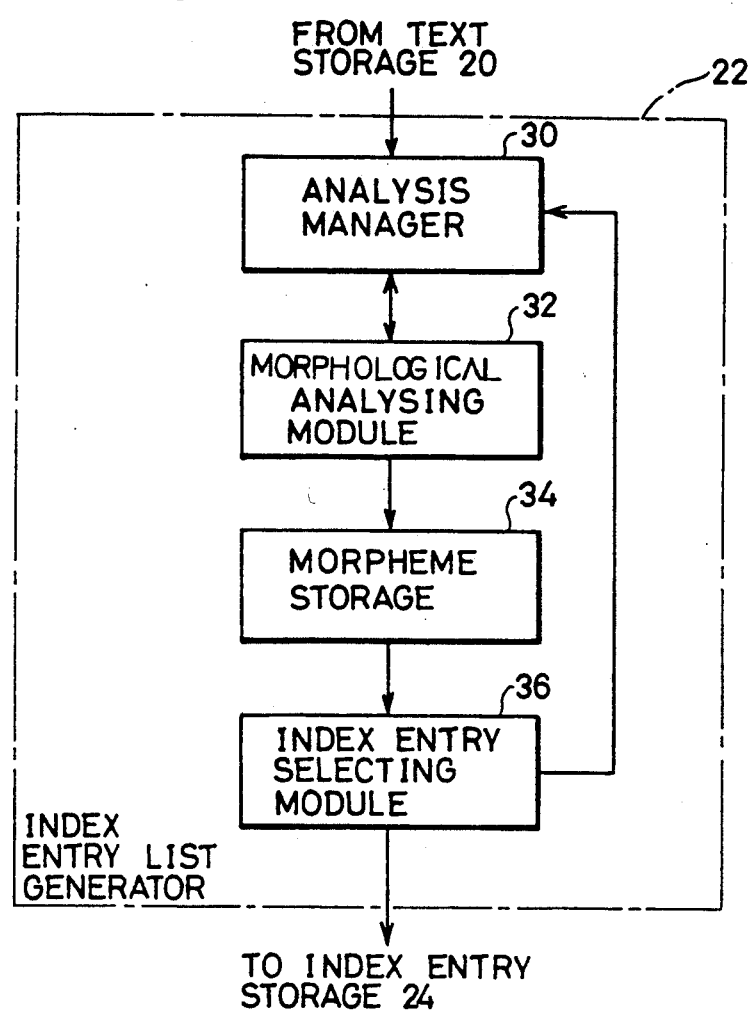
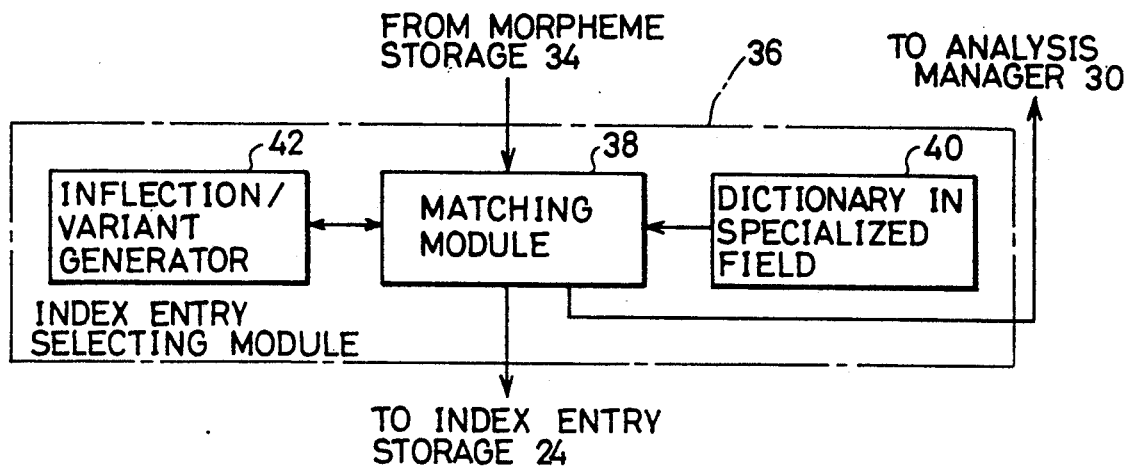

| ENTRY | PART-OF-SPEECH | ID |
|---|---|---|
| TO | PREPOSITION | 0001 |
| INPUT | TRANSITIVE VERB | 0002 |
| INDIVIDUAL | ADJECTIVE | 0003 |
| KANJI | ADJECTIVE | 0004 |
| CHARACTER | NOUN | 0005 |

| STANDARD ENTRY | PART-OF-SPEECH | INFLECTION | VARIANT SPELLING |
|---|---|---|---|
| WINDOW | n | 1 + S | |
| ON-KUN-INPUT | n | | 1.ON-KUN INPUT |
| NEXT | adv<br>prep<br>n | | |
| TRANSLATION | n | | |
| 62 | 64 | 66 | 68 |

TO INPUT INDIVIDUAL KANJI CHARACTER

WHEN YOU CANNOT OBTAIN A DESIRED KANJI CHARACTER BY WORD/PHRASE CLUSTERING TRANSLATION METHOD, PRONUNCIATION METHOD IS AVAILABE. ANY KANJI CHARACTER CAN BE OBTAINED BY INPUTTING THE "ON" PRONUNCIATION OR "KUN" PRONUNCIATION. THE METHOD IS CALLED ON-KUN INPUT.

⟨ BASIC OPERATION ⟩

(1) INPUT PRONUNCIATION OF THE KANJI CHARACTER.
(2) PRESS ON-KUN KEY.
(3) A KANJI CHARACTER WITH THE GIVEN PRONUNCIATION APPEARS ON THE DISPLAY. PRESS NEXT/TRANSLATION OR BACKWARD UNTIL DESIRED CHARACTER APPEARS ON THE SCREEN (WINDOW).

FIG.10

| START | END | ID | COUNT | CLAUSE |
|-------|-----|------|-------|--------|
| 01    | 02  | 0001 | 0001  |        |
| 04    | 08  | 0002 | 0001  |        |

FIG.11

| PAGE | LINE | START | END   | CNT | INDEX ENTRY  | INITIAL LETTER |
|------|------|-------|-------|-----|--------------|----------------|
| 1,1  | 3,11 | 21,25 | 31,35 | 2   | TRANSLATION  | T              |
| 1    | 6    | 1     | 12    | 1   | ON-KUN-INPUT | O              |
| 1    | 11   | 20    | 23    | 1   | NEXT         | N              |
| 1    | 12   | 34    | 39    | 1   | WINDOW       | W              |

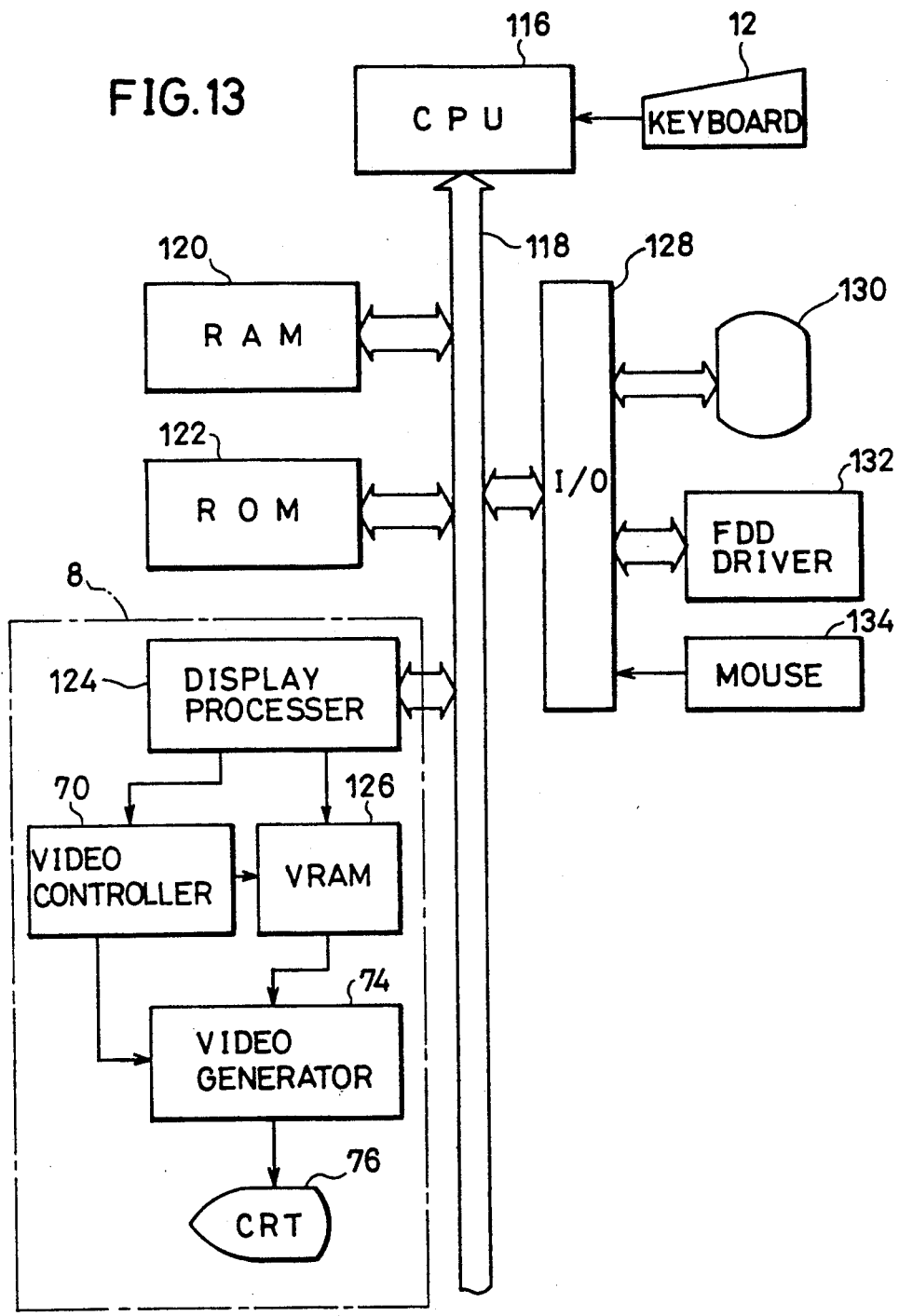

| (a) | CONDITION PART | | ACTION PART |
|---|---|---|---|
| (b) | STRINGS + "," | → | DEFINE A SENTENCE |
| (c) | STRINGS + NEW LINE | → | DEFINE A SENTENCE |
| (d) | NUMERIC DIGITS + "." + SENTENCE | → | DEFINE A TITLE |
| (e) | HEAD OF TEXT AND LENGTH < LINE-WIDTH | → | DEFINE A TITLE |

FIG.21

| 001 | 01 | 01 | 37 | (TITLE) |
|-----|----|----|----|---------|

| | CONTIDION PART | | ACTION PART |
|---|---|---|---|
| (a) | | | |
| (b) | ···⟨IS⟩CALLED X | → | X DEFINES A HEADING |
| (c) | ⟨CALL⟩···AS X | → | X DEFINES A HEADING |
| (d) | ···⟨IS⟩NAMED X | → | X DEFINES A HEADING |
| (e) | WE⟨DEFINE⟩X AS ··· | → | X DEFINES A HEADING |

| PAGE | LINE | S | E | CNT | ENTRY | I.L. | RULE | S/D |
|------|------|---|---|-----|-------|------|------|-----|
| 001 | 12 | 34 | 39 | 1 | WINDOW | W | a-2-3 | S |
| 001 | 06 | 01 | 12 | 1 | ON-KUN-INPUT | O | a-1-1 | S |

| PAGE | LINE | S | E | CNT | ENTRY | I.L | RULE | S/D |
|------|------|----|----|-----|-------------|-----|-------|---|
| 001  | 06   | 01 | 12 | 1   | ON-KUN-INPUT| O   | a-1-1 | S |
| 001  | 11   | 20 | 23 | 1   | NEXT        | N   | a-1-3 | S |
|  94  |  96  | 98 |100 | 102 |    104      | 106 |  202  |210|

FIG. 26

| PAGE | LINE | S | E | CNT | ENTRY | I.L | RULE | S/D |
|------|------|----|----|-----|-------------|-----|-------|---|
| 001  | 06   | 01 | 12 | 1   | ON-KUN-INPUT| O   | a-1-1 | S |
| 001  | 11   | 20 | 23 | 1   | NEXT        | N   | a-1-3 | S |
| 001  | 12   | 34 | 35 | 1   | WINDOW      | W   | a-2-3 | D |
|  94  |  96  | 98 |100 | 102 |    104      | 106 |  202  |210|

FIG. 27

⟨N⟩
NEXT....................1
⟨O⟩
ON-KUN-INPUT...........1
⟨T⟩
TRANSLATION............1

FIG. 25A

| SELECT /DELETE | INDEX ENTRY | INITIAL LETTER | PAGE |
|---|---|---|---|
| # | WINDOW | W | 1 |
|  | ON-KUN-INPUT | O | 1 |
|  | NEXT | N | 1 |
|  | TRANSLATION | T | 1 |

INPUT TEXT FILE NAME: AIMS
INDEX FILE NAME: AIMS.ED

PRESS F1 TO DISPLAY KWIC
PRESS CAN TO EXIT
PRESS F2 TO SELECT OR DELETE AN ENTRY
PRESS ↑,↓,→,← TO MOVE CURSOR

FIG. 25B

TRANSLATION                                                              1/2

WORD/PHRASE-CLUSTER TRANSLATION METHOD, PRONUNCIATION

TO INPUT INDIVIDUAL CHINESE CHARACTER

WHEN YOU CANNOT OBTAIN A DESIRED CHINESE CHARACTER BY WORD/PHRASE-CLUSTER TRANSLATION METHOD, PRONUNCIATION METHOD IS AVAILABE. ANY CHINESE CHARACTER CAN BE OBTAINED BY INPUTTING THE "ON" PRONUNCIATION OR "KUN" PRONUNCIATION. THE METHOD IS CALLED ON-KUN-INPUT.

<BASIC OPERATION>

(1) INPUT PRONUNCIATION OF THE CHINESE CHARACTER.
(2) PRESS ON-KUN KEY.
(3) A CHINESE CHARACTER WITH THE GIVEN PRONUNCIATION APPEARS ON THE DISPLAY. PRESS NEXT/TRANSLATION OR BACKWARD UNTIL DESIRED CHARACTER APPEARS ON THE SCREEN (WINDOW).

TO MOVE BETWEEN WINDOWS, PRESS ALT+↑↓. TO CANCEL, PRESS CAN. TO DISPLAY NEXT KWIC, PRESS TRANSLATION NEXT.

APPARATUS FOR AUTOMATICALLY GENERATING INDEX

BACKGROUND OF THE INVENTION

1. Field of the Invention

The present invention relates generally to apparatuses for automatically creating indexes for books, documents and the like, and more specifically, to an apparatus for automatically generating an index, glossary, concordance, a keyword list and the like and editing the same as required.

2. Description of the Related Art

Indexes are attached to many of manuals explaining operations of machines and computers as well as to many of books systematically describing technical matters. Indexes enhance the value of the books. Without an index, even a value of a book with excellent contents is depreciated by half. No one looks through even half of a bulky book to find just one word.

An index is not only useful for operating a machine. An index is also important for the studies concerning the humanities. If it had not been for a concordance of Bible or the works of Shakespeare, researchers would be at a loss facing the originals.

Indexes had been created as follows before documents could be made up by electrotonic apparatuses such as a word processor.

First, an author and/or an editor of a book or a manual marks strings of characters which are thought to be appropriate as an index entries by a specific code. Thereafter, desirably a plurality of persons copy the marked strings on other pieces of paper together with the occurrence pages of the strings. At this time, one word is entered in one paper. When many strings are expected to extracted, it is preferable that the size of the paper is small.

After all the marked strings are copied on the pieces of paper, all the pieces of paper are rearranged, for example, alphabetically in accordance with the strings entered therein. The strings entered in the rearranged pieces of paper are adopted as index entries in its order.

Creating indexes manually as described above has an advantage of adaptability in extracting entries. For example, any code can be used for use as a mark. There is no limitation on the size of the mark.

However, the above-described manner has the following problems. First, a large number of manhours are required for marking entries, copying the marked strings on pieces of paper and alphabetically rearranging the pieces of paper in which the strings are entered. The more the number of strings to be extracted is increased, the more rapidly the required time is increased.

Secondly, there is a high possibility of occurrence of errors. As the number of strings to be extracted is increased and the number of people working is increased, the number of errors included in the completed indexes is thought to be larger.

The third problem is that it is difficult to create indexes before the completion of the document. In case the document is revised, the index should be looked into to review the strings related to the revision. Even after the completion of the document, such problem can occur.

The fourth problem is that when an author of the document is different from a person creating the index, the created index might not exactly match the contents of the document. Such problem could occur, for example, in the selection of index entries and reference pages. In such a case, one who uses the index will be frustrated failing to find the desired and adequate information.

The fifth problem is that when strings to be adopted as entries are marked by different persons, the completed indexes might be made different. This results from the fact that criteria for use in marking the strings are not shared. The reason for such lack of common criteria is that knowledge necessary for creating indexes is not collected.

A large part of the above-described problems is resolved by the development of computerized text processing system such as a word processor. A document is ordinarily stored as coded textual data in a computer.

Assume that strings to be adopted as index entries in this textual data are given some mark. As long as the marks are distinguishable from other characters used in the document, the computer is capable of rearranging the marked strings very easily in relation with the pages of the occurrences thereof in the alphabetical order or in accordance with other arbitrary rules.

The above-described process is deterministic. A computer is capable of carrying out this process with unerring precision unless a hardware error or a program error occurs. The development of the text processing system supported by the computer eliminates restrictions and errors from the works most requiring manpower in index making.

Even in this case, however, the paper is simply replaced by an electric display apparatus. It is still a task of an author or an expert editor to apply a particular symbol to a string or a strings of characters to be adopted as an index entry. Accordingly, the problem relating to the selection of entries still remains to be solved.

Several methods of solving this problem are proposed. One is described in "Support System of Autoindex of Manuals and Autoglossary" (Collected Articles of the 37th National Conference of '88 society of Information Processing) and the other is disclosed in Japanese Patent Application entitled "System of Extracting Japanese Text Keyword" (Japanese Patent Laying-Open No. 63-217418) by Kobayashi et al.

Before explaining the above-described two proposals, characteristics of the Japanese language dealt by the two proposals will be described.

As is well known in the field of linguistics, the Japanese language comprises two types of alphabets "hiragana" and "katakana" each having about 50 syllables and logographic, rather than alphabetic, "kanji"(-chinese character). The kanji characters are read in "on" pronunciation originated from the Chinese language and in "kun" pronunciation originated from the Japanese language. The pronunciation of the kanji characters can be resolved by taking words and phrases into consideration.

Conventionally, in the Japanese language, a newly introduced concept has been expressed commonly by "kango" which is a combination of a plurality of kanji characters. Recently, a foreign word expressing a new concept is often transliterated and expressed in "katakana". Accordingly, for example, most of the technical words are expressed in kanji characters or katakana.

The proposal by Takahashi et al. is based on such characteristics of the Japanese language. According to Takahashi et al., the delimitation of a sentence by hiragana enables extraction of words comprising only kango or katakana, thereby enabling extraction of a technical word.

However, this proposal is only applicable to the Japanese language. While Takahashi et al. state that they formed an index creating apparatus having the above-described functions, they do not disclose an constitution thereof.

FIG. 1 is a block diagram of the apparatus proposed by Kobayashi et al. Referring to FIG. 1, the apparatus comprises a display unit 502, a keyboard 504, a Japanese text file 508, a Japanese text editor 506, a string extracting module 510, a keyword extracting module 512, a non-keyword file 518, a string occurrence tally table 520, a database updating module 516 and a keyword database 514.

Japanese text file 508 is for storing a coded Japanese text. Japanese text editor 506 edits a Japanese text file based on input from keyboard 504 by an operator. String extracting module 510 is for extracting technical words included in the document by selecting a word comprising only kanji or katakana in the same manner as by Takahashi et al.

Non-keyword file 518 is for storing a set of words which are not characteristic of the text. Keyword extracting module 512 is for selecting only an appropriate strings by comparing the string extracted by string extracting module 510 with the set of words, which are thought to be inappropriate for keywords, stored in non-keyword file 518, for extracting strings of frequent occurrence as keywords among the selected strings and for displaying the same in display unit 502. String occurrence tally table 520 is a working table for storing the string occurrence counted by keyword extracting module 512.

Keyword database 514 is for storing the extracted set of keywords. Database updating module 516 is for adding to keyword database 514 appropriate keywords selected by the operator among the keywords extracted by keyword extracting module 512 and displayed in display unit 502 in response to the input from keyboard 504 by the operator. Module 516 is also for adding to non-keyword file 518 the inappropriate keywords among the displayed keywords designated by the operator through keyboard 504.

In the processing of the Japanese language, different and separate ranges of internal codes are assigned to hiragana, katakana and kanji. Accordingly, such distinction among kanji, katakana and hiragana as described above can be easily made by checking the range of codes.

Referring to FIG. 1, this apparatus operates as follows. Keyboard 504 applies Japanese text data to Japanese text editor 506. Japanese text editor 506 converts characters of the inputted Japanese words to internal codes. Japanese text editor 506 stores the coded Japanese text in Japanese text file 508 to enable the later revision.

String extracting module 510 receives the coded text data from Japanese text editor 506. String extracting module 510 makes the determination as to which belong to the inputted characters among hiragana, katakana and kanji by checking the range of the codes as described above and extracts the strings including only katakana and/or kanji.

Keyword extracting module 512 compares each string extracted by string extracting module 510 with the set of non-keywords stored in non-keyword file 518. Module 512 selects only the strings not stored in non-keyword file 518. Every time a keyword considered appropriate occurs, keyword extracting module 512 counts the frequency of the occurrence of the keyword by using string occurrence tally table 512.

Database updating module 516 first displays the keywords extracted by keyword extracting module 512 in display unit 502. The operator checks the list of the keywords displayed in display unit 502. When a word inappropriate for a keyword is displayed, the operator instructs the database updating module 516 through keyboard 504 to exclude the word from the list of the keywords. Database updating module 516 adds to non-keyword file 518 the string designated by the operator as inappropriate for a keyword. Database updating module 516 also adds to keyword database 514 the strings not designated as inappropriate by the operator.

In the apparatus shown in FIG. 1, strings which can be used as keywords are extracted from the text in accordance with the characteristics of the Japanese language. Furthermore, strings inappropriate for keywords are excluded from the extracted strings. No manual operation is required for extracting the strings from the text. In addition, the contents of non-keyword file 518 are referred to in extracting the appropriate keywords. Accordingly, it is considered that the criteria of selection of words in creating the index are normalized to some extent.

However, the proposal by Kobayashi et al. has the following problems. In the apparatus according to Kobayashi et al., extraction of strings is carried out based only on the characteristics of the Japanese language. Kobayashi et al. do not disclose applicability of the apparatus to other languages.

In addition, in the apparatus according to Kobayashi et al, the extracted strings might be deleted by referring to the non-keyword file. Once registered in the non-keyword file, the word will not be adopted as an index entry thereafter. Besides, the determination as to whether or not the word is registered in the non-keyword file is made by an operator. Accordingly, when a plurality of operators use this apparatus, the choice of the keywords is limited because the non-keyword file is a sum of the respective non-keyword files of the operators.

Furthermore, in the apparatus according to Kobayashi et al., the word adopted as a keyword should have high frequency of occurrence in the document. While a word of frequent occurrence in one document is surely thought to be important, the opposite is not true. Namely, there could be a case where a string occurring just once in the document expresses an important concept. It is possible for the apparatus according to Kobayashi et al. to allow such an important word to be left out from the index.

Furthermore, in the disclosure by Kobayashi et al., no consideration is given to a field of knowledge in the document for which the index is used. Thus, difference in words in different fields is ignored. The apparatus according to Kobayashi et al. allows important words to be left out from an index or unimportant words to occur through the document, costing much time in editing the index.

SUMMARY OF THE INVENTION

Therefore, an object of the present invention is to provide an apparatus capable of efficiently creating an index of any text written and coded in any language.

Another object of the present invention is to provide an apparatus capable of efficiently creating an appropriate index in accordance with a field of knowledge dealt with by a document.

A further object of the present invention is to enable efficient creation of an appropriate index in accordance with a field dealt with by a document on systematic criteria.

A further object of the present invention is to provide an apparatus capable of efficiently creating an index including fewer errors on systematic criteria.

A still further object of the present invention is to provide an apparatus allowing an uninitiated operator efficiently and easily create an appropriate index as a specialist does.

The apparatus for creating an index of coded textual data according to the present invention includes a textual data storage for storing coded textual data; a text analyzing device for analyzing the stored textual data in the textual data storage to divide the textual data into a plurality of meaningful strings, each string being related to its occurrence position in the textual data; a specialized word storage for storing a set of specialized words in a field of knowledge related to the textual data; an entry selecting module for selecting only strings having equivalents in the set of specialized words as index entries among the strings by referring to the set of specialized words stored in the specialized word storage to create index entry data by pairing the selected strings with the occurrence positions thereof and for storing the same; and an index outputting device for outputting the index of the textual data by arranging the selected index entries in a prescribed order and outputting the arranged entries together with symbols indicative of the entry occurrence positions in the textual data in a visible form.

In this apparatus, entries are finally selected by referring to the set of specialized words. Appropriate specialized words can be selected beforehand in accordance with the contents of the textual data. Accordingly, irrespective of who operates the apparatus, only strings appropriate for index entries are adopted.

According to another aspect of the present invention, the apparatus for creating an index of coded textual data includes a textual data storage for storing coded textual data; a text analyzing device for analyzing the textual data stored in the textual data storage to divide the textual data into a plurality of meaningful strings, each string being associated with each occurrence position in the textual data; an entry selecting rule storage for storing rules for the selection of index entries from the textual data; an entry selecting device for selecting strings to be entries among the strings divided by the text analyzing device under the rules for extracting entries to create and store entry data; an index outputting device for outputting the index of the textual data by arranging the selected index entries in a prescribed order and outputting the arranged entries together with symbols indicative of the entry occurrence positions in the textual data in a visible form.

According to the above-described apparatus, rules for selecting index entries are prepared beforehand, whereby selection of entries is made by referring to these rules. Since the entries are extracted from the text under the rules for selecting the entries, only words appropriate for entries are outputted for use in the index. In addition, by storing rules for selecting indexes in the selecting rule storage, which rules are conventionally held by specialists only, the rules can be shared by all the operators. Accordingly, irrespective of an operator, only the strings appropriate for index entries can be extracted on systematic criteria.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram of an index entry list generator.

FIG. 4 is a block diagram of an index entry selecting module.

FIG. 9 is a display example of an example text to be processed.

FIG. 10 is a schematic diagram showing a state of a stored result of morphological analysis.

FIG. 11 is a schematic diagram of the storage contents of the data regarding the extracted index entries.

FIG. 13 is a block diagram of an apparatus implemented by the first embodiment of the present invention using a computer.

FIG. 21 is a schematic diagram showing a storage layout of the determination result of sentence.title.

FIG. 22 is a schematic diagram showing an example of a rule for determining a sentence pattern.

FIG. 23 is a schematic diagram showing a storage layout of the index entry extracted under the rules.

FIG. 24 is a schematic diagram showing the results obtained by alphabetically sorting the index entries.

FIG. 25A is a schematic diagram showing one example of an index editing screen.

FIG. 25B is a schematic diagram showing one example of a search screen.

FIG. 26 is a schematic diagram showing a storage layout of the edited index entry data.

FIG. 27 is a schematic diagram of one example of an index outputted according to the second embodiment.

DESCRIPTION OF THE PREFERRED EMBODIMENTS

Figure 2:
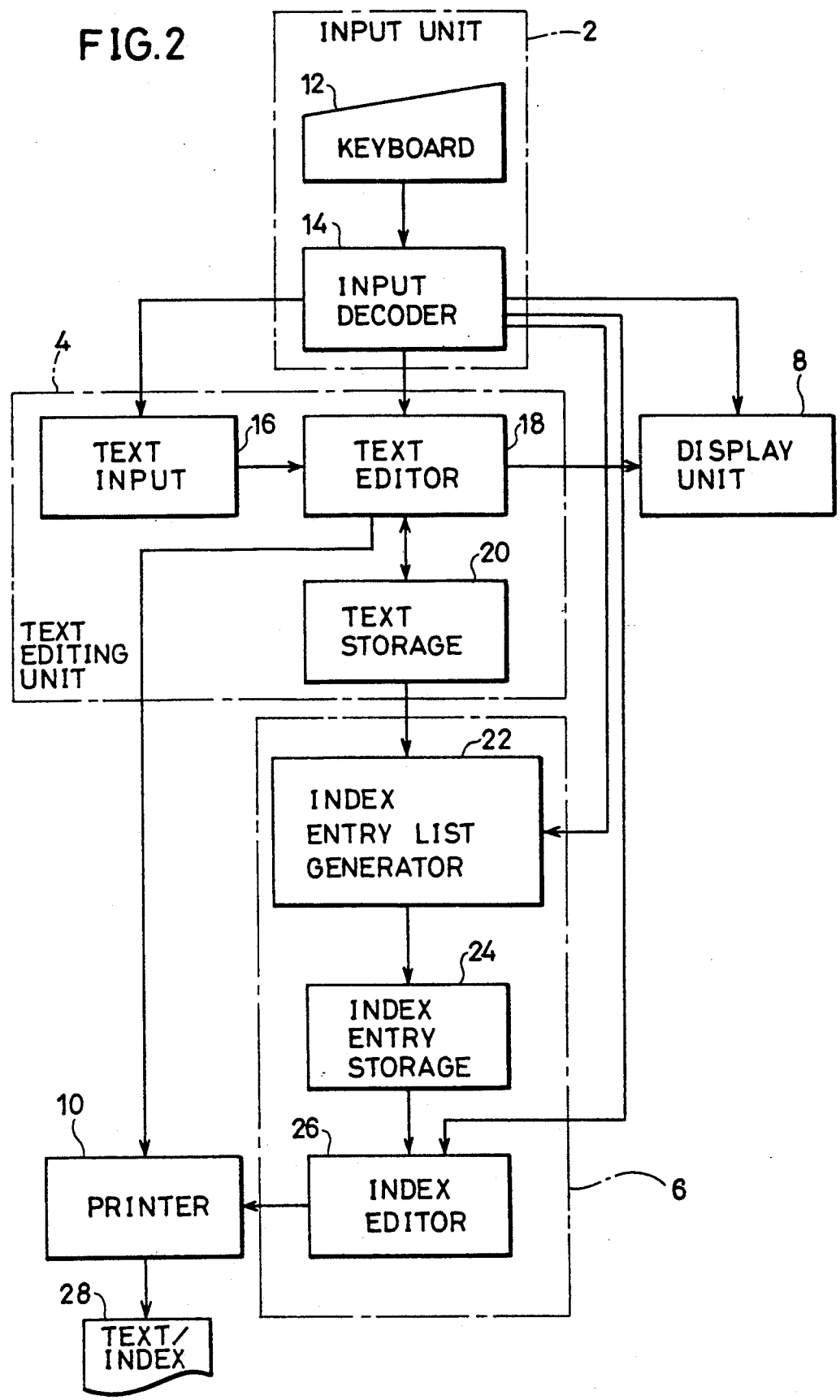
FIG. 2 is a block diagram of an apparatus according to a first embodiment of the present invention.

Referring to FIG. 2, the index creating apparatus according to one embodiment of the present invention comprises an input unit 2 for enabling input by an operator by generating signals such as character data or operation codes in response to a manual operation, a text editing unit 4 connected to input unit 2 for an interactive text data editing through input unit 2, a display unit 8 for displaying the edited text or the like, an index generating unit 6 connected to input unit 2 and text editing unit 4 for automatically generating an index from the text edited by text editing unit 4, and a printer 10 connected to text editing unit 4 and index generating unit 6 for printing the edited text or the index on paper 28.

Input unit 2 includes a keyboard 12 having a plurality of keys for encoding data by the selective depression of keys to generate unique codes and/or symbols and an input decoder 14 for decoding the data from keyboard 12 to transmit instructions to the respective units 4, 6, 8 and the like to perform necessary processings.

Text editing unit 4 includes a text input unit 16 connected to input decoder 14, a text editor 18 connected to text input unit 16 and a text storage 20 connected to text editor 18.

Text input unit 16 is, for example, a flexible disk driver (FDD) for applyinq text data stored in a external medium to text editor 18. The output of text editor 18 is connected to display unit 8. Text editor 18 is for editing text in accordance with the data applied from input unit 2 or text input unit 16 to display the edited text in display unit 8 and store the same in text storage 20.

Index generating unit 6 includes an index entry list generator 22 connected to text storage 20 for extracting index entries from the textual data, an index entry storage 24 connected to index entry list generator 22 for storing the index entries outputted from the generator 22, and an index editor 26 for editing the index entries stored in index entry storage 24 based on the instructions from the input unit 2 and for applying the edited index entries to printer 10. Index editor 26 is for alphabetically rearranging the index entries and classifying the same into different initial letters to enable printing of the index.

Referring to FIG. 3, index entry list generator 22 is for linguistically analyzing the text inputted from text storage 20. Index entry list generator 22 includes an analysis manager 30 connected to text storage 20 for managing the length of the sentence to be analyzed and synchronization of the analyzing operation, a morphological analyzing module 32 connected to analysis manager 30 for analyzing vocabularies of the sentence to divide the sentence into morphemes, a morpheme storage 34 for storing a set of morphemes outputted by morphological analyzing module 32, and an index entry selecting module 36 for reading data related to the morphemes from morpheme storage 34 and selecting only appropriate ones as index entries.

After applying one unit of sentence (or a string of characters) to morphological analyzing module 32, analysis manager 30 receives a signal indicative of completion of the entry selection from index entry selecting module 36, thereby starting processing of the next sentence to manage synchronization of the operations of index entry list generator 22. The output of index entry selecting module 36 is connected to index entry storage 24 (FIG. 2).

Referring to FIG. 4, index entry selecting module 36 includes a dictionary in specialized field for storing words in the field of knowledge particularly related to the document to be processed, a matching module 38 for reading morphemes from morpheme storage 34, comparing the same with the entries in dictionary in specialized field 40 and applying the matching morphemes to index entry storage 24, and an inflexion/variant generator 42 for generating inflexion/variant of the entries in dictionary in specialized field 40 based on the information included in dictionary in specialized field to subject the same to the matching by matching module 38 again, when matching of dictionary in specialized field 40 by matching module 38 fails.

Figures 5, 6:
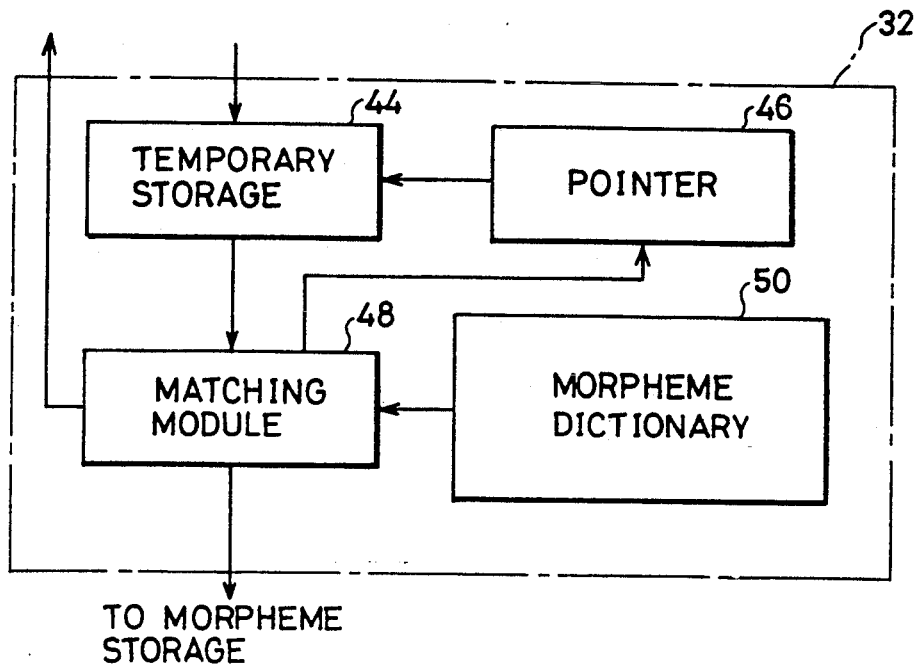
FIG. 5 is a block diagram of a morphological analyzing module.
FIG. 6 is a schematic diagram showing a layout of storage contents of a morpheme dictionary.

Referring to FIG. 5, morphological analyzing module 32 includes a temporary storage 44 for temporarily storing the textual data received from analysis manager 30, a pointer 46 for indicating a location of the character or the word being matched among the text data stored in temporary storage 44, a morpheme dictionary 50 covering morphemes of the language in which the text data is written, and a matching module 48 for reading a string of a predetermined length out of temporary storage 44 at the position indicated by pointer 46, examining whether or not the string matches a morpheme in morpheme dictionary 50 and for applying the morpheme to morpheme storage 34 when the matching is detected. Matching module 48 is for transmitting to analysis manager 30 a signal indicative of the completion of the textual data stored in temporary storage 44.

Referring to FIG. 6, a layout 58 of the data stored in morpheme dictionary 50 includes a morpheme entry field 52, a field 54 indicative of part-of-speech of the morpheme and an ID field 56 indicative of an identification number of the morpheme. The identification number written in ID field 56 is unique in morpheme dictionary 50.

Layout 58 further includes a field for maintaining information indicative of reading of a morpheme in the case of such language as the Japanese language wherein most of the kanji characters have more than two readings, although the processing of English or the like does not require such a field. It should be further noted in FIG. 6 that the entries shown in FIG. 6 are just a part of the entire dictionary. Morpheme dictionary 50 should have a sufficiently large number of entries in order to adequately divide the textual data.

Figures 7, 8:
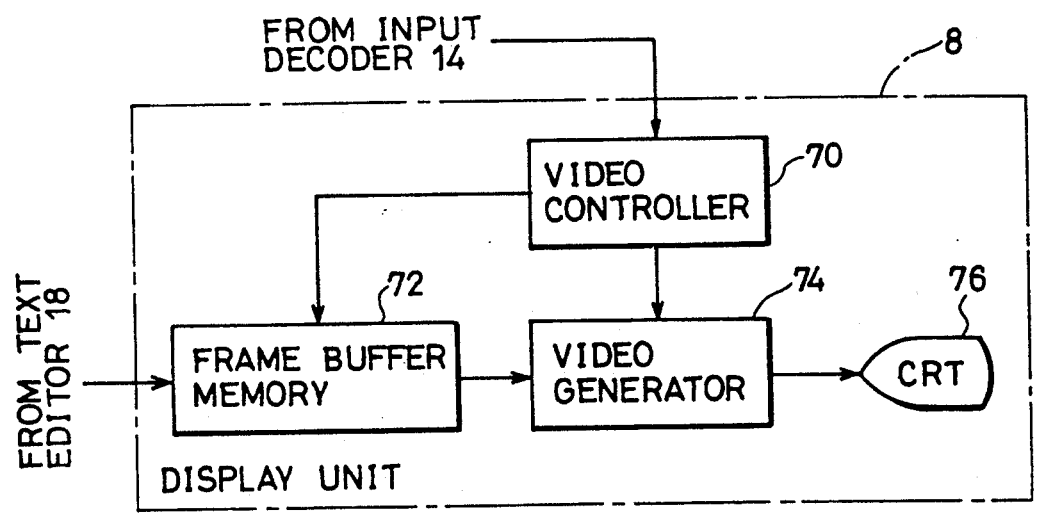
FIG. 7 a schematic diagram showing a layout of storage contents of a dictionary in specialized field.
FIG. 8 is a block diagram of a display unit.

Referring to FIG. 7, a layout 60 of the data stored in dictionary 40 in specialized field of index entry selecting module 36 (FIG. 4) includes a standard entry field 62, a part-of-speech field 64, an inflexion field 66 and a variant spelling field 68.

Specialized words for use in the field of knowledge related to the textual data to be processed are previously selected to fully cover the field and written in standard entry fields 62. Part-of-speech field 64 contains information indicative of part-of-speech of each standard entry. Inflection field 66 indicates data for generating, for example, inflections of verbs and plural forms of nouns. In FIG. 7, the data corresponding to "1+s" is written in the inflection field 66 for a word "WIN- DOW", for example. This information means that "WINDOW" is followed by s to generate a plural form. Similarly, "1 . On-Kun Input" written in the variant field in the second line "On-Kun-Input" shows that "On-Kun-Input" can be also spelled "On-Kun Input".

The data in inflexion field 66 and variant spelling field 68 is applied to inflection/variant generator 42 to be used in generating inflections/variants.

Layout 60 shown in FIG. 7 includes no information regarding pronunciation of the standard entries. This is sufficient in the case of English. However, the field including pronunciation information of the standard entries as described above is required for the Japanese language, for example.

Referring to FIG. 8, display unit 8 includes a frame buffer memory 72 for storing font data indicative of each character of the text transmitted from text editor 18 in the form suitable for display on screen, a video generator 74 for reading the data stored in the frame buffer memory 72 and converting the same to video signals, a CRT (Carthod-Ray-Tube) 76 for reproducing the video signals outputted from video generator 74, and a video controller 70 for controlling frame buffer memory 72 and video generator 74 in accordance with the instructions from input decoder 14.

Operation of the above-described apparatus will be described with reference to the drawings in the following. The operator creates text data in text storage 20 by using input unit 2, text editing unit 4 and display unit 8. Other text data created in the other devices can be transferred to text storage 20 by text input unit 16 through a flexible disc, a magnetic tape, a communication line and the like.

Any text stored in text storage 20 can be displayed in display unit 8 by text editor 18. The text data stored in the text storage 20 also can be applied to printer 10 through text editor 18 to be printed on paper by printer 10.

As is well known in the field of the art, the text data stored in text storage 20 includes coded strings of characters, punctuation marks, control characters and the like. The control characters are code patterns defined for indicating, for example, the centering of a line, new line, change of the character formed and the like. The control character is mainly used for formatting the text at the output or display of the textual data, and is ordinarily suppressed in display.

The techniques required for the above-described input, output, editing of text data and the like are well known in the field of art. Accordingly, no detailed description thereof will not be made herein.

FIG. 9 shows one example of display of the textual data stored in the text storage 20. This textual data is edited by text editor 18 to be displayed in text editing screen 78 of display unit 8.

Such a document as requiring an index is ordinarily thought to have a large number of pages. However, for the convenience of explanation, it is assumed herein that the text data to be processed has just one page as shown in FIG. 9. As is apparent to those skilled in the art, such limitation is directed only to facilitating understanding of the present invention.

The text data shown in FIG. 9 indicates one paragraph of an operation manual of a Japanese word processor explaining a method of inputting a kanji character. For the facility of understanding, the contents of the text data will be briefly described in the following.

As is already described, the Japanese language has two kinds of alphabets and kanji character set. Each of the two types of alphabets, hiragana and katakana, has about 50 syllables. Diacritical marks are used for example, to change a letter "ha" to "ba" or "pa".

The number of kanji is said to reach several ten thousands. However, those daily used in Japan are said to be about several thousands. In Japan, 2965 kanji characters are settled as the Level I and 3388 kanji characters are settled as the Level II of JIS (JAPAN INDUSTRIAL STANDARD) for use by computers.

The settled kanji codes use two-byte codes and include English, Russian and Greek characters. The kanji codes further include hiragana and katakana. Since both of hiragana and katakana can be expressed by one byte, 7-bit codes, these can be expressed by at least two kinds of codes. However, in an ordinary Japanese text processing, hiragana and katakana are dealt as two-byte codes.

The large number of kanji characters makes the input by a keyboard having a limited number of keys extremely difficult. Since pronunciation of a kanji character is basically expressed only by hiragana, it is natural that a method was adopted in Japan of inputting hiragana and converting the same into kanji characters. This method falls into a plurality of categories.

The first method is to input a pronunciation of a kanji and convert the same to a kanji character. A code of a desired kanji can be obtained by examining a list of a kanji characters with the inputted pronunciation as a key.

However, there are usually more than two kanji characters which have the same pronunciation. A plurality of unnecessary kanji characters must be skipped until the desired kanji character is found, which results in inefficient input.

Kana-kanji translation is the method for solving the above-described shortcomings. In this method, the pronunciation of a word (generally including more than two kanji characters) or a phrase (word +word, kanji character +hiragana, word +hiragana and the like) is inputted and is translated to a kanji character(s). As the key pronunciation is long, ambiguity is reduced.

However, according to this method, the combinations of kanji characters are large in number and is virtually infinite. In adopting the kana-kanji translation in a computer, the number of storable words and phrases is limited to a predetermined number mainly because of the storage capacity. Thus, there is a case where a desired kanji character is not obtained. In such a case, the method of inputting individual kanji character is supplementally employed. FIG. 9 is a text explaining such a method of inputting kanji characters.

Referring to FIG. 9, the text includes a title 78a and a body 78b. The title mainly shows the contents of the text and is ordinarily provided in the first part of the text. The title may be provided also in the text, and in such a case it is often provided in one line together with numbers of a chapter or a paragraph. The title is sometimes drawn in thick letters.

In the case of the text shown in FIG. 9, title 78a is shown in large-sized letters to emphasize the difference from body 78b.

Body 78b states the contents regarding the title in more detail. In the case of the text shown in FIG. 9, described us an operating method for displaying an individual kanji character on a screen by inputting the pronunciation thereof.

Referring to FIG. 3, analysis manager 30 of index entry list generator 22 reads the textual data (the one shown in FIG. 9) stored in text storage 20 and divides the same into units to be analyzed, for example, sentence units. This division is carried out by using punctuation marks, control characters and the like in the text data. This technique is already established and therefore, no further detailed description thereof will be given here.

Analysis manager 30 applies one sentence obtained by the division to temporary storage 44 of morphological analyzing module 32. Temporary storage 44 stores the sentence. At this time, pointer 46 indicates the head of temporary storage 44. In the case of the text shown in FIG. 9, a sentence "To input individual kanji character" is stored in temporary storage 44.

The sentence stored in temporary storage 44 is subjected to such language analysis as morphological analysis, syntax analysis and semantic analysis. A module performing the syntax analysis, the semantic analysis and the like is not shown in FIG. 3. In the present embodiment, the process of the morphological analysis is described in order to show the principle of the language analysis. While it can not be said that the technique is completely established for syntax analysis, semantic analysis and the like of natural languages, it is well known that technique of some level has been obtained.

The stored sentence is ordinarily checked letter by letter from the head by matching module 48, so that the sentence is divided by predetermined delimiter characters for example, space and control characters, into a plurality of words. This process to an English text is carried out by a well known method. Furthermore, matching module 48 searches morpheme dictionary 50 to see whether or not there are entries matching the divided words in morpheme dictionary 50.

When the corresponding entry is found, matching module 48 outputs the corresponding entry and the information attached thereto in morpheme dictionary 50 to morpheme storage 34 which stores the same. Matching module 48 places the point indicated by pointer 46 to the position of the subsequent word and reads the subsequent word from temporary storage 44 to repeat the above-described operation.

When no corresponding entry is not found in morpheme dictionary 50, matching module 48 outputs nothing to morpheme storage 34. Matching module 48 places the point indicated by pointer 46 to the position of the subsequent word and reads the same from temporary storage 44 to repeat the above-described operation.

As a result, there outputted to morpheme storage 34 is only words (morphemes) that are included in the text and that also have the corresponding matching entry found in morpheme dictionary 50.

In the case of English, ordinarily the respective words are written separately. Thus, one sentence can be easily divided into words constituting the sentence. Such processing as described above using morpheme dictionary 50 is unnecessary in some cases. However, the Japanese language does not have such a custom as writing a sentence separately. Analysis of morphemes of such a sentence not separately written is carried out as follows.

Matching module 48 takes out the first character of the sentence stored in temporary storage 44. Matching module 48 checks morpheme dictionary 50 to find an entry corresponding to the letter. When there is a matched entry, matching module 48 makes the determination that the letter is a morpheme and outputs the letter to morpheme storage 34.

When there is no matching entry, matching module 48 takes out the subsequent character from temporary storage 44. Matching module 48 appends character taken out to the previously taken-out one character and searches morpheme dictionary 50 again to retrieve a matching entry.

When the matching is detected, matching module 48 makes the determination that the two letters constitute one morpheme and applies the same to morpheme storage 34. When no matching is detected, matching module 48 further takes out the subsequent one character from temporary storage 44 and searches the morpheme dictionary to find an entry matching the string comprising the three characters.

Matching module 48 repeats the above-described operation to divide the sentences stored in temporary storage 44 into morphemes and output the same to morpheme storage 34.

As the foregoing, manners of morpheme analysis are very different in English and, for example, in Japanese.

Various known methods are used for the retrieval of entries in morpheme dictionary 50 by matching module 48. The first method is to scan the data stored in morpheme dictionary 50 from the top until an entry matching to a target word is found. It is difficult by this method to meet the time requirement when the number of entries included in morpheme dictionary 50 is large.

The second method is to structure the morpheme dictionary 50 such that an entry with a given pronunciation can be found in a fixed short time by adopting the spellings of the entries as keys. In the case where the dictionary is prepared as a file in a hard disk, this corresponds to structure the file as so called an indexed sequential file, a direct file and the like. These are techniques established in this field of the art and no detailed description thereof will be made here.

Morpheme dictionary 50 can be contained on a semiconductor memory. In such a case, morpheme dictionary 50 can be accessed at a high speed. So called a DRAM (Direct Access Memory) or a content addressable memory can be used as a semiconductor memory device.

The data stored in morpheme storage 34 has a layout 80 shown in FIG. 10, for example. One record in layout 80 (one line in case of a table stored in a semiconductor memory) has a start position field 82, an end position field 84, an identifier (ID) field 86, an occurrence count field 88 and an end-of-clause mark field 90.

Start position field 82 indicates a start position of the morpheme in sentence. End position field 84 indicates an end position of the morpheme in the sentence. Identifier field 86 indicates an identifier (indicated by the field 56 in FIG. 6) applied by morpheme dictionary 50 to the morpheme. Occurrence count field 88 indicates the number of occurrences of the morpheme in the textual data. End-of-clause mark field 90 is where a symbol indicating an end of clause is written in the case where the morphological analysis is carried out for individual phrases, as in Japanese language.

Identifier field 86 is provided in layout 80 shown in FIG. 10 in order to enable the retrieval of the string of characters of a morpheme in the later processing. Namely, the corresponding entry can be obtained by searching morpheme dictionary 50, using the contents of identifier field 86 as a key. Accordingly, in place of identifier field 86, the contents of entry field 52 in morpheme dictionary shown in FIG. 6 may be directly included.

In processing the Japanese language, a field displaying the pronunciations thereof is required, although it is not provided in FIG. 10. This is because an index of the Japanese language is ordinarily collated in an alphabetical order of hiragana indicative of the pronunciation of kanji characters.

The set of morphemes stored in morpheme storage 34 is further collated with dictionary in specialized field 40 by matching module 38 of index entry selecting module 36 (FIG. 4). Matching module 38 extracts only a morpheme equivalent to the one in dictionary 40 in specialized field among the morphemes stored in morpheme storage 34 and applies the result thereof to index entry storage 24.

Collation between each morpheme and each entry of the dictionary in a specialized field by matching module 38 is carried out as follows. Matching module 38 compares a first entry in dictionary in specialized field 40, "WINDOW" in the case of the dictionary in specialized field shown in FIG. 7, with a target morpheme. When they match with each other, matching module 38 outputs the morpheme to index entry storage 24.

When they do not match with each other, matching module 38 checks "inflection" or "variant" field below the entry of dictionary 40 in specialized field. When this field includes some information, matching module 38 applies the standard entry being processed to inflection/variant generator 42 together with the information in the "inflection" or "variant" field.

Inflexion/variant generator 42 generates an inflexion of the standard entry or a variant of the spelling based on the applied information and provides the same to matching module 38 for matching.

Suppose that "On-Kun Input" in the sixth line of the text shown in FIG. 9 is compared with "On-Kun-Input" in the second line of FIG. 7, for example. They do not match with each other in the first comparison. At this time, inflection/variant generator 42 generates the expression "On-Kun Input" from the contents of the variant field. This matches the object morpheme for processing. Therefore, "On-Kun Input" is adopted as an entry of the index and stored in index entry storage, 24.

Matching module 38 compares the applied inflection or variant with the target morpheme of the processing. When the matching is detected, matching module 38 selects the morpheme as an entry and outputs the same to index entry storage 24 together with the necessary information. The information outputted to index entry storage 24 may not be a morpheme itself but may be an inflexion or a variant thereof.

FIG. 11 shows a layout 92 of the data of the extracted index entry stored in index entry storage 24. Layout 92 includes an index entry field 104, a page field 94, a line field 96, a start position field 98, an end position field 100, an occurrence count field 102 and an initial letter field 106.

Initial letter field 106 is not always required as is the case with English where a spelling of an index entry coincides with a sort key. However, this field is indispensable in processing the Japanese language, because an index entry does not always coincide with a sort key (the reading of the entry) in Japanese. In processing Japanese, initial letter field 106 may be a field indicative of the entire pronunciation (hiragana) of the index entry.

In FIG. 11, the morphemes written in the index entry column are retrieved from the morpheme dictionary shown in FIG. 6, using the identifiers in identifier field 86 shown in FIG. 10 as keys.

Figure 1:
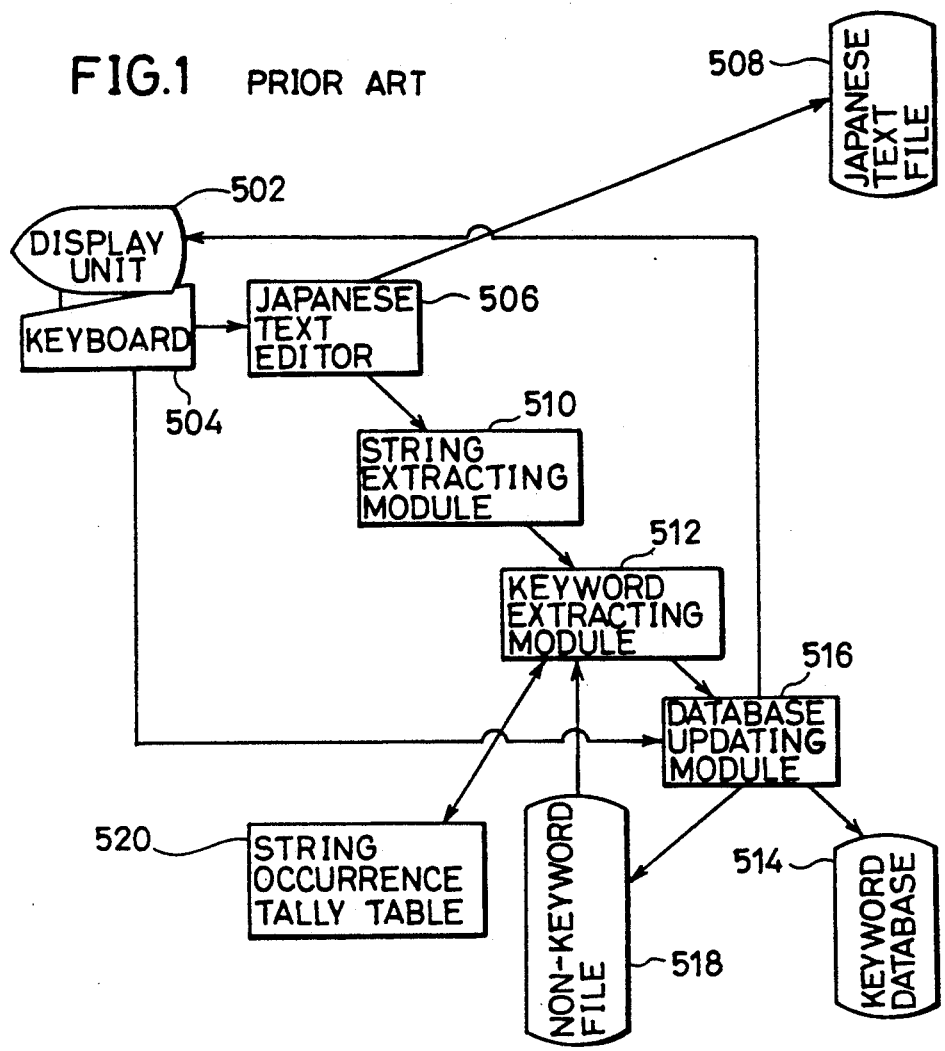
FIG. 1 is a block diagram of a Japanese word processor which is an example of a conventional apparatus.
Figure 12:
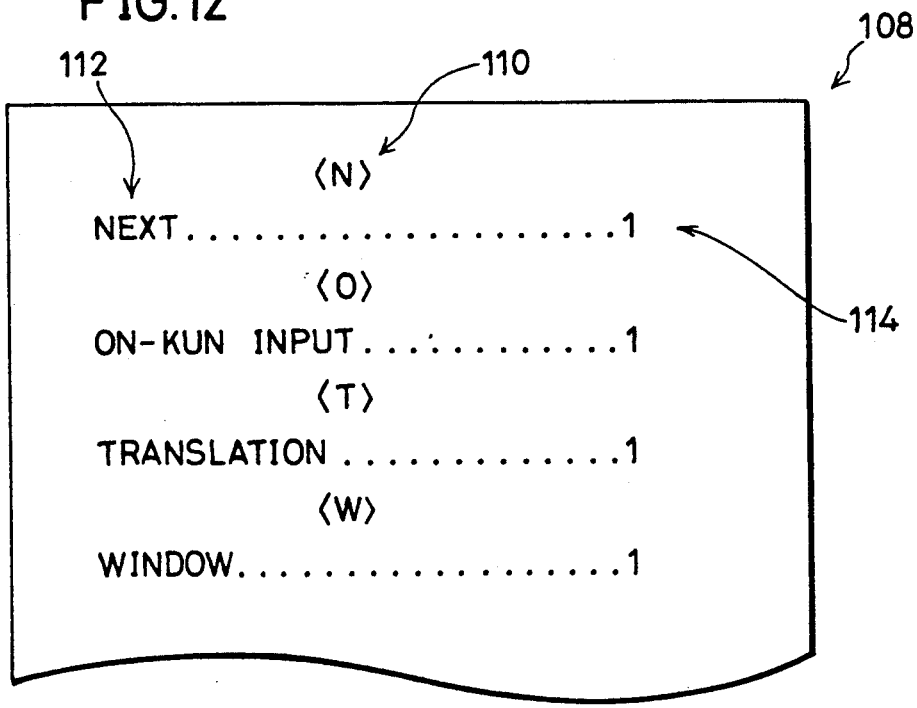
FIG. 12 is a schematic diagram showing an output example of an index according to the first embodiment.

Index editor 26 of FIG. 2 edits the information stored in index entry storage 24 and shown in layout 92 (FIG. 11) and applies the edited information to printer 10 in the form of a layout 108 shown in FIG. 12. The contents of initial letter field 106 (FIG. 11) are alphabetically displayed as an index 110 in layout 108. Index entries 112 having the same initial letter as that of the heading are alphabetically outputted under the heading. A page description 114 is attached to each index entry.

The index shown in FIG. 12 is divided by alphabetical letters. However, the division is not always necessary to be carried out on the basis of initial letter. For example, it is also possible to divide an index such that all words starting with alphabets A-C are placed under an entry of "A" or "A-C". In such a case, the contents of initial letter field 106 in FIG. 11 are replaced by representative letters.

As the foregoing, according to the apparatus, the code data in the textual data is divided into morphemes. Only the one matching a word stored in dictionary 40 in specialized field is adopted as an index entry among the morphemes. Accordingly, it is not possible that unnecessary words are adopted as entries.

The dictionary in specialized field is prepared taking inflections and variants of words into consideration. Therefore, even if the same concepts are expressed in different forms, both expressions are adopted as index entries. In addition, it requires only a small amount of memory capacity compared with a case where variants are prepared as separate standard entries. Or it is possible to extract important entries including a wider range of variants using the same amount of capacity.

A manual operation is scarcely required and the same index can be created by any operator. This is because the same criteria, dictionary 40 in specialized field, is prepared. Accordingly, only the entries considered to be important on the systematic criteria is extracted.

Dictionary 40 in specialized field allows addition of new entries. A new variant of the already registered entry can be registered in a variant field of the entry. Therefore, it is possible to collect as shared properties the knowledge on vocabulary for extracting index entries which knowledge only the specialists have been permitted to have conventionally.

The above-described embodiment has such arrangements as shown in FIGS. 2-8. A large part of the respective blocks is practically implemented by a computer, peripheral apparatus thereof and the program executed on the computer because of a general-purposeness and flexibility thereof.

FIG. 13 is a block diagram of the apparatus according to the first embodiment implemented by a computer. Referring to FIG. 13, the apparatus comprises a CPU 116 connected to a keyboard 12, a bus 118 connected to CPU116, RAM 120 and ROM 122 connected to bus 118, a display unit 8 connected to bus 118 for displaying a text or the like, an I/0 interface 128 connected to bus 118 for interfacing CPU 116 with an external device, and such input/output devices as hard disk 130 connected to bus 118 through I/0 128, an FDD driver 132 and a mouse 134.

Display unit 8 comprises a display processor 124 connected to bus 118 for processing data to displaying data processed by CPU 116, a VRAM 126 as a frame buffer memory, a video generator 74 for generating a video signal from the data stored in VRAM 126, CRT 76 for reproducing the video signal generated by video generator 74 and a video controller 70 controlled by display processor 124 for controlling VRAM 126 and video generator 74.

RAM 120 serves as text storage 20, index entry storage 24 (FIG. 2), morpheme storage 34 (FIG. 3), temporary storage 44 and the like. RAM 120 is also for storing a part of dictionary 40 in specialized field and morpheme dictionary 50 and for enabling the access to the same at high speed.

ROM 122 is for storing an initial program to be executed in CPU 116 at the time of power-up.

Hard disk 130 is for storing such dictionaries as dictionary 40 in specialized field and morpheme dictionary 50. Hard disk 130 is also for storing a plurality of textual data entities.

FDD driver 132 is for reading a document stored in a flexible disk and the like into this apparatus.

Mouse 134 is, similar to keyboard 12, for encoding a manual operation by an operator into a signal. Input of command by mouse 134 is carried out by displaying icons on a screen and collating a position indicated by a mouse pointer (which is equivalent to a cursor and is indicated by an arrow moving on the screen along with an operation of the mouse) and a table listing the command corresponding to the respective coordinates on the screen.

I/O 128, hard disk 130, FDD driver 132 and the like operate in cooperation with each other as text input unit 16.

CPU 116 is for implementing functions of, for example, input decoder 14, text editor 18 (FIG. 2), analysis manager 30, morphological analyzing module 32, index entry selecting module 36 (FIG. 3), matching module 38, inflexion/variant generator 42 (FIG. 4) and matching module 48 (FIG. 5) by the program executed therein.

Since RAM 120 and hard disk 130 are equivalents of each other in function, although they are different in characteristics, data to be stored is allotted thereto in consideration of the necessity of response or the like.

Figure 14:
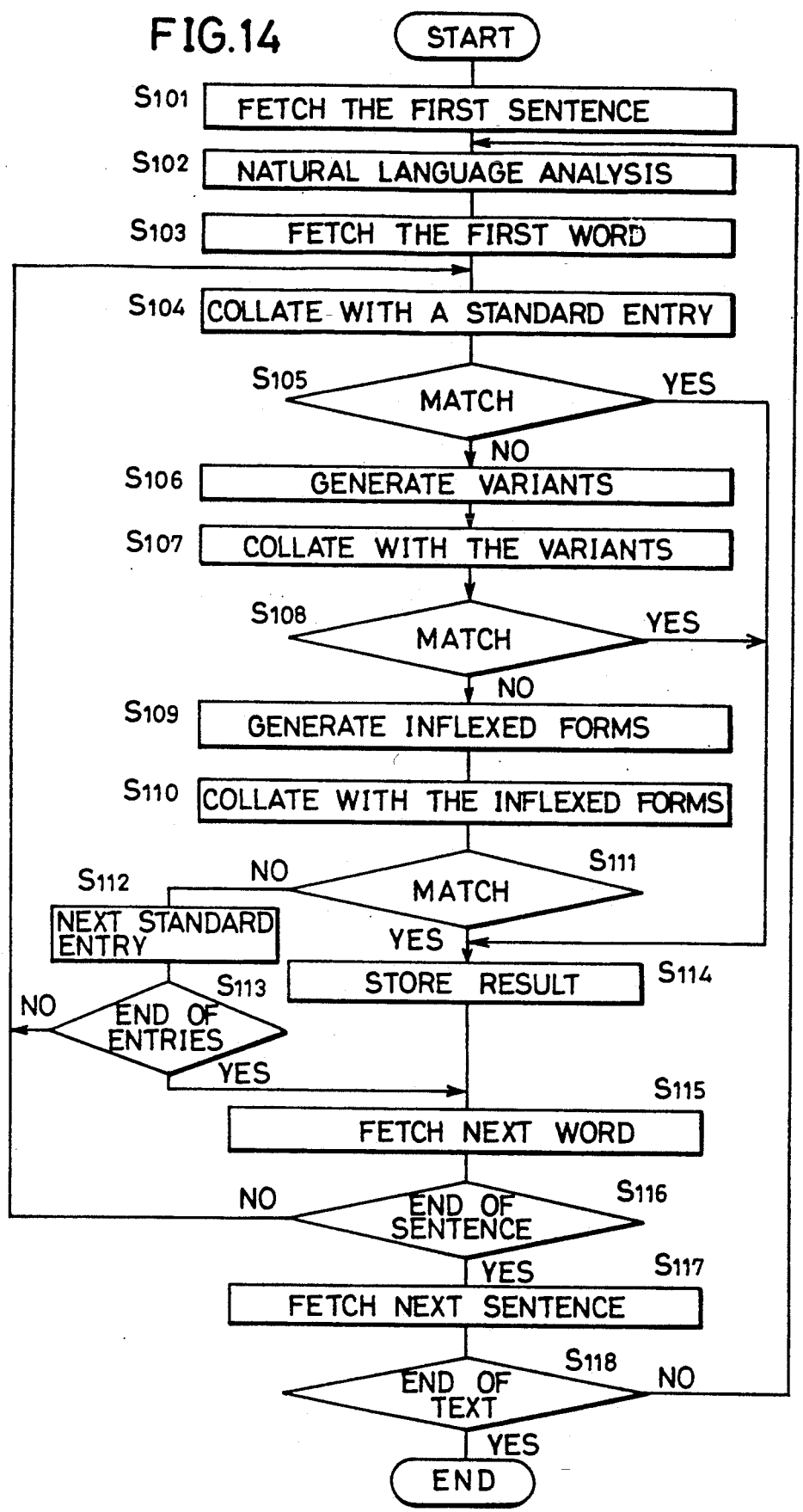
FIG. 14 is a flow chart of a program to be executed in the computer shown in FIG. 13.

FIG. 14 is a flow chart of a program executed in CPU 116. Referring to FIG. 14, this program has a control structure as described in the following. For explanation's sake, the same words as those used in FIGS. 2-12 are used as indicating the respective functions in the following.

Referring to FIG. 14, in step S101, a first sentence of the target textual data is read in analysis manager 30 of index entry list generator 22. In the case of the example shown in FIG. 9, the sentence of title 78a "TO INPUT INDIVIDUAL KANJI CHARACTER" is read in analysis manager 30.

In step S102, language analysis is carried out for the sentence read-in. The language analysis is a natural language analysis including morphological analysis by module 32, syntax analysis and the semantic analysis by modules not shown and the like.

The sentence is divided into, for example, morphemes in this process. In the case of English, one sentence is divided into a plurality of words constituting the sentence. The result is stored in morpheme storage 34 (RAM 120) in accordance with such layout 80 as shown in FIG. 10.

In step S103, the first word among the obtained plural morphemes (words) is read into matching module 38 of the index entry selecting modules 36. In the case of the example shown in FIG. 9, the word "TO" is read.

In step S104, the word read by matching module 38 is collated with a standard entry in dictionary 40 in specialized field. In step S105, the determination is made as to whether or not there is a standard entry matching the target word in dictionary 40 in specialized field. If the answer of the determination is YES, the control proceeds to step S114 and if not, the control proceeds to step S106.

When the control proceeds to step S114, the standard entry matching the target word is adopted as an index entry and stored in index entry storage 24 (RAM 120) in accordance with layout 92 shown in FIG. 11.

When the control proceeds from step S105 to step S106, it is checked whether or not field 68 of FIG. 7 includes information regarding variant. When the information is included, a variant is generated.

In step S107, the generated variant is collated with the target.

In step S108, the determination is made as to whether or not there is a variant in generated ones that matches the target. If the answer of the determination is YES, the control proceeds to step S114 and if not, the control proceeds to step S109.

In step S109, it is determined whether or not field 66 of the dictionary in specialized field shown in FIG. 7 includes information regarding inflection. If the dictionary includes the information, the inflected form is generated.

In step S110, the generated inflected form is collated with the target word.

In step S111, the determination is made as to whether the generated inflected form matches the target word or not. If the answer of the determination is YES, the control proceeds to step S114 and if not, the control proceeds to step S112.

When none of the standard entry, the variants thereof and the inflected forms thereof match the target word, the next standard entry in the dictionary in the specialized field is fetched in step S112.

In step S113, the determination is made as to whether the dictionary has come to an end or not. If the answer of the determination is NO, the control returns to step S104 and the above-described processes are repeated for the next standard entry.

If the answer of the determination in step S113 is YES, which means that no equivalent of the target word is found in the dictionary in specialized field, the target word is not adopted as an index entry, whereby the control proceeds to step S115. The control proceeds from steps S114 and S113 to step S115. Since the processing for one word has come to its end, the next word is fetched in step S115. In the case of the example of FIG. 9, the word "INPUT" is fetched.

In step S116, the determination is made as to whether there exists the next word to be read in step S115 or not. Namely, in step S116, the determination is made as to whether or not matching of all the words constituting the target part of the text to be processed is carried out. If the answer of the determination is NO, the control returns to step S104 and the above-described processes for a new word is repeated. If the answer of the determination in step S116 is YES, the processing for the sentence has come to its end and the control proceeds to step S117.

In step S117, the next one sentence in the text data is fetched. In the case of the example shown in FIG. 9, one sentence starting with "WHEN" in body 78b is fetched as the next target to be processed.

In step S118, the determination is made as to whether there exists a sentence to be fetched in step S117 or not. Namely, in step S118, the determination is made as to whether the target textual data to be processed has come to its end or not. If the answer of the determination is NO, the control again proceeds to step S102, wherein a series of processes such as language analysis to the sentence is repeated. If the answer of the determination in step S118 is YES, which means that the processing for all the morphemes of all the sentences of the textual data has come to its end, this program ends.

As a result, the data of the index entry in accordance with layout 92 of FIG. 11 is created in RAM 120 or hard disk 130. The created data of index entry is processed by other output program and the like and printed as the index shown in FIG. 12.

The collation of the dictionary in specialized field performed in the above-described flow chart is successively carried out with respect to each target word from the head of the dictionary. If the number of entries in the dictionary in specialized field is not small, this method is inefficient. Accordingly, such methods are employed as structuring the dictionary in a specialized field random accessible or content addressable. These methods are well known in the field of the art and therefore no detail description thereof will be given here.

In the case of the example shown in FIG. 9, when the word "translation" in the third line becomes a target the collation of dictionary 40 in specialized field by matching module 39 succeeds. The reason is that the word "translation" is the first word occurring in the example text shown in FIG. 9 among the standard entry in the dictionary in specialized field shown in FIG. 7.

"ON-KUN INPUT" in the sixth line of the example sentence shown in FIG. 9 shows a first successful example of collation by the variant information of the dictionary in specialized field. In FIG. 7, a standard entry corresponding to the word is "ON-KUN INPUT". The spelling thereof does not coincide with the spelling of the word shown in FIG. 9. However, the collation succeeds by generating a variant "ON-KUN-INPUT" in accordance with the variant information included in field 68. As a result, the word "ON-KUN INPUT" is adopted as an index entry.

The collation by inflexion field 66 shown in FIG. 7 is carried out similarly to the collation by the information of the variant spelling field. Therefore, it is possible to collate, for example, inflexions of persons in the case of verbs, plural forms in case of nouns, the comparative and the superlative in the case of adjectives, by generating the same from the original words. As a result, the word can be extracted on the systematic criteria without excessively increasing the number of standard entries in the dictionary in specialized field.

In the above-described embodiment, the textual data is language-analyzed on a sentence basis. The result of the analysis is further collated with the dictionary in specialized field on a word basis. However, the present invention is not limited thereto. For example, language analysis can be carried out not on a sentence basis but on a morpheme basis. In this case, the collation of each morpheme with the dictionary in specialized field may be carried out every time a morpheme is obtained or may be carried out after the completion of the language analysis of the entire textual data.

According to the above-described embodiment, it is possible to store the specialist's knowledge as a dictionary in specialized field. An index of the text data can be automatically created by referring to the dictionary in specialized field, so that time required for creating the index can be reduced. Since the format of the document is also referred to in creating the index, the page numbers attached to the entries are not indicated erroneously. Furthermore, since the extracted words are collated as the internal data of the computer with the dictionary, a conventional erroneous transcription can be prevented. An index can be accurately and easily created even in the course of creating the document.

The above-described first embodiment is an example where the specialist's knowledge is stored as a dictionary in specialized field. However, the specialist's knowledge is not limited to a field of the vocabulary. Namely, when a specialist selects an index entry, he pays attention not simply to what word occurs where but sometimes to what kind of information is given thereto.

Suppose that a certain word occurs frequently in the text. In such a case, it is fundamentally enough to indicate in the index all the occurrence positions. However, an index including all occurrences might be difficult of use.

Suppose that one tries to know a definition of a word, for example. While a definition of a word is commonly given in the first part of the text, it is sometimes given in the middle of the text. One has to waste one's time in successively checking from the head of the text the pages described in index while referring to the index in order to know a definition of the word.

One in the above-described case can attain one's object very easily if the index indicates only the pages where a definition or an important explanation of a word is given. Such selection of entries is supposed to be conventionally carried out by specialists under a certain rule established based on their own knowledge.

The apparatus according to the second embodiment of the present invention is directed to putting to practical use the knowledge stored by specialist as the foregoing other than the knowledge concerning the vocabulary.

Figure 15:
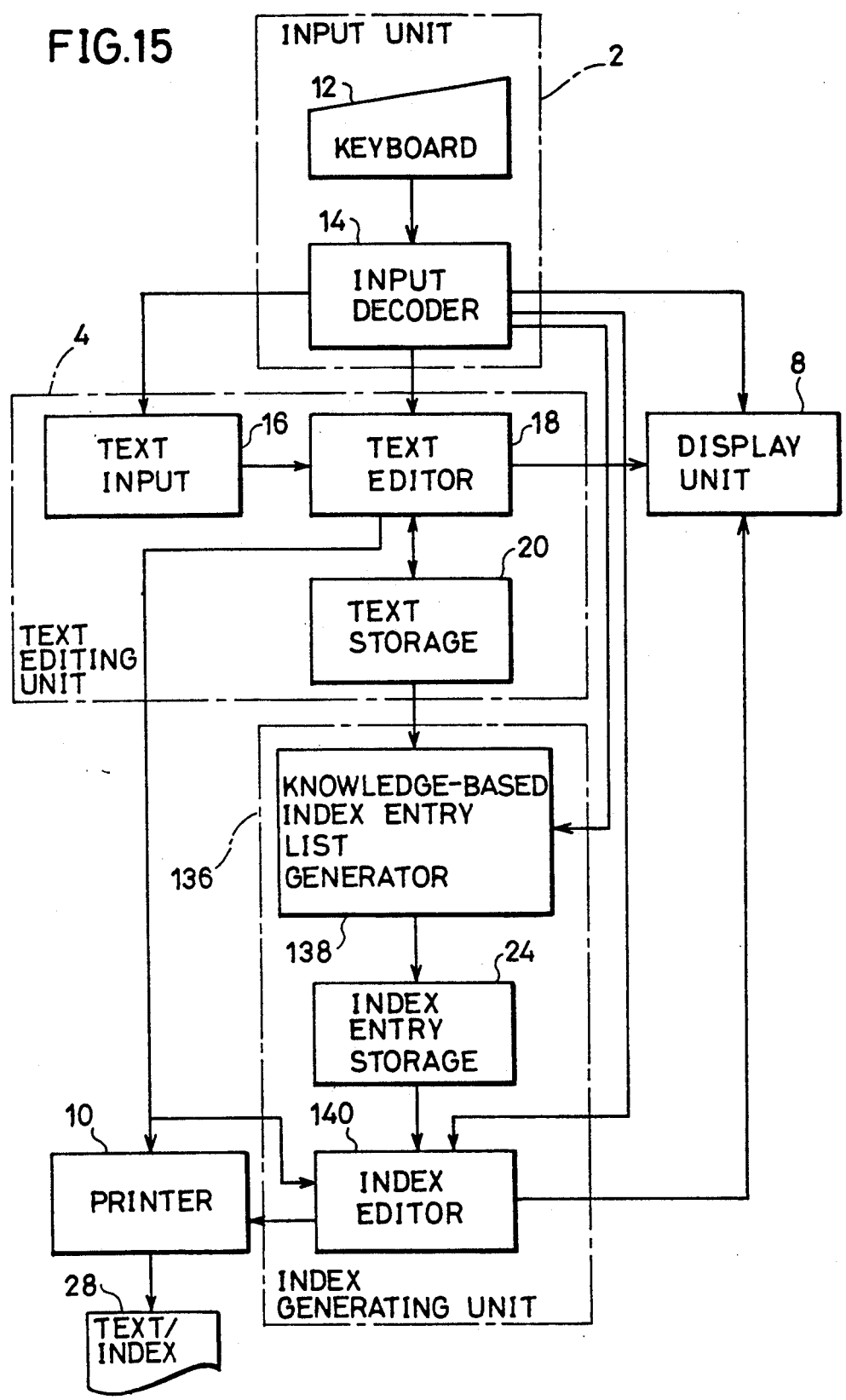
FIG. 15 is a block diagram of an apparatus according to a second embodiment of the present invention.

Referring to FIG. 15, the apparatus according to the second preferred embodiment of the present invention differs from the apparatus shown in FIG. 2 in that a knowledge-based index entry list generator 138 for generating an index entry list by using a knowledge base is provided in place of index entry list generator 22 of FIG. 2 and in that an index editor 140 capable of interactively editing an index entry list is provided in place of index editor 26 for merely editing the contents of index entry storage 24 and applying the edited contents to printer 10.

Like reference numerals and names are applied to like parts in FIGS. 15 and 2. The function thereof are also the same. Therefore, no further description thereof will be given here.

Figure 16:
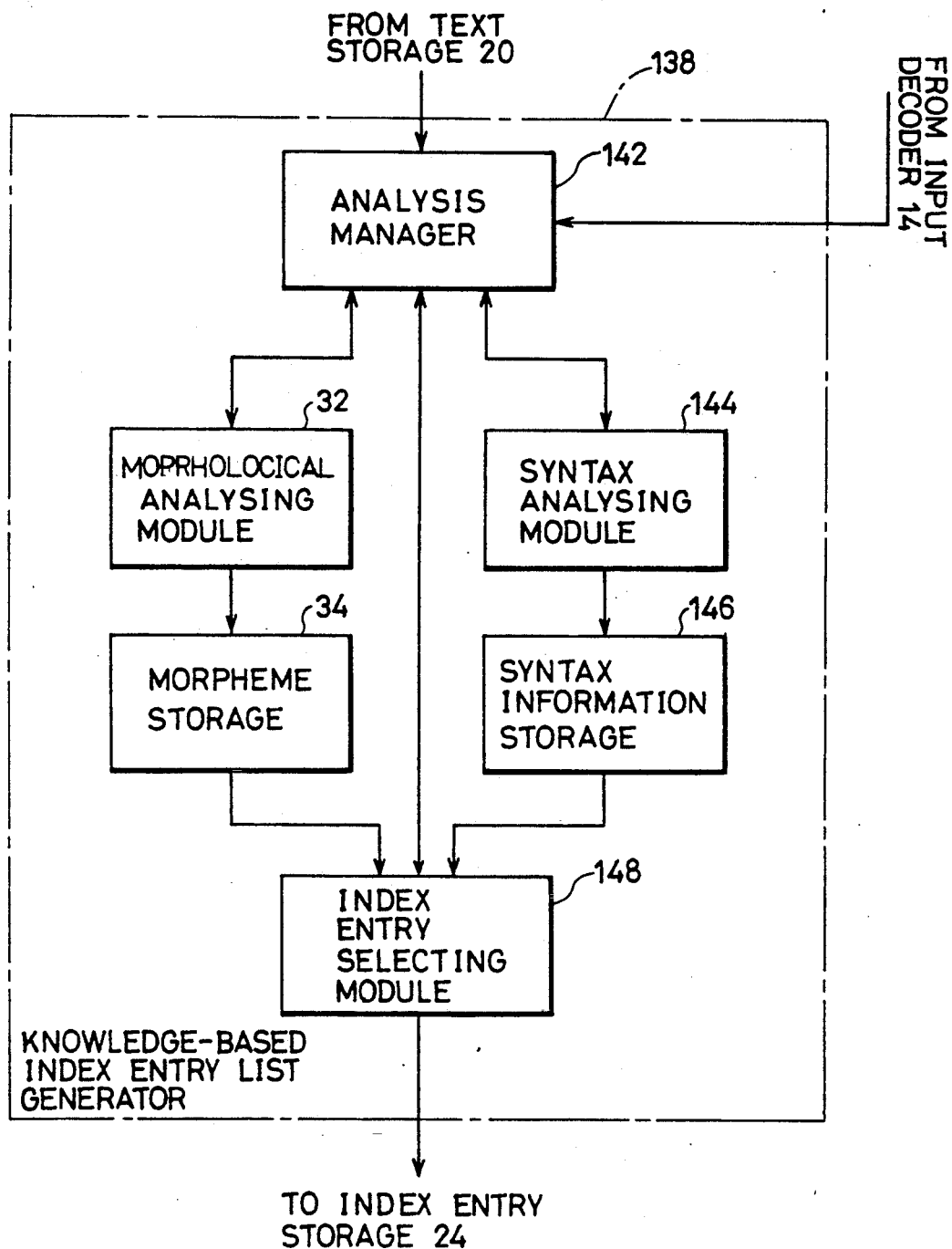
FIG. 16 is a block diagram of an index entry list generator according to the second embodiment.

Referring to FIG. 16, knowledge-based index entry list generator 138 of the apparatus according to the second preferred embodiment comprises an analysis manager 142, morphological analyzing module 32, morpheme storage 34, a syntax analyzing module 144, a syntax information storage 146 and an index entry selecting module 148.

Analysis manager 142 is for managing the analysis by knowledge-based index entry list generator 138. Morphological analyzing module 32 and morpheme storage 34 are the same as those illustrated in FIG. 3. Accordingly, a detailed description thereof will not be given here.

Syntax analyzing module 144 is for analyzing a form of a target text to be processed under prescribed text structure rules. Module 144 makes the determination whether a predetermined unit of text data applied from analysis manager 142, for example, one sentence, is a title or a body. The determination result is stored in syntax information storage 146.

Index entry selecting module 148 is for selecting appropriate index entries based on the set of morphemes stored in morpheme storage 34 and the syntax information stored in syntax information storage 146 under prescribed rules. The selected entries are applied to index entry storage 24 together with necessary information.

Index entry storage 24 is for storing information regarding the entries applied from knowledge-based index entry list generator 138. The information convenient for interactive editing is added to the information stored in index entry storage 24 by index entry selecting module 148 of knowledge-based index entry list generator 138.

Figure 17:
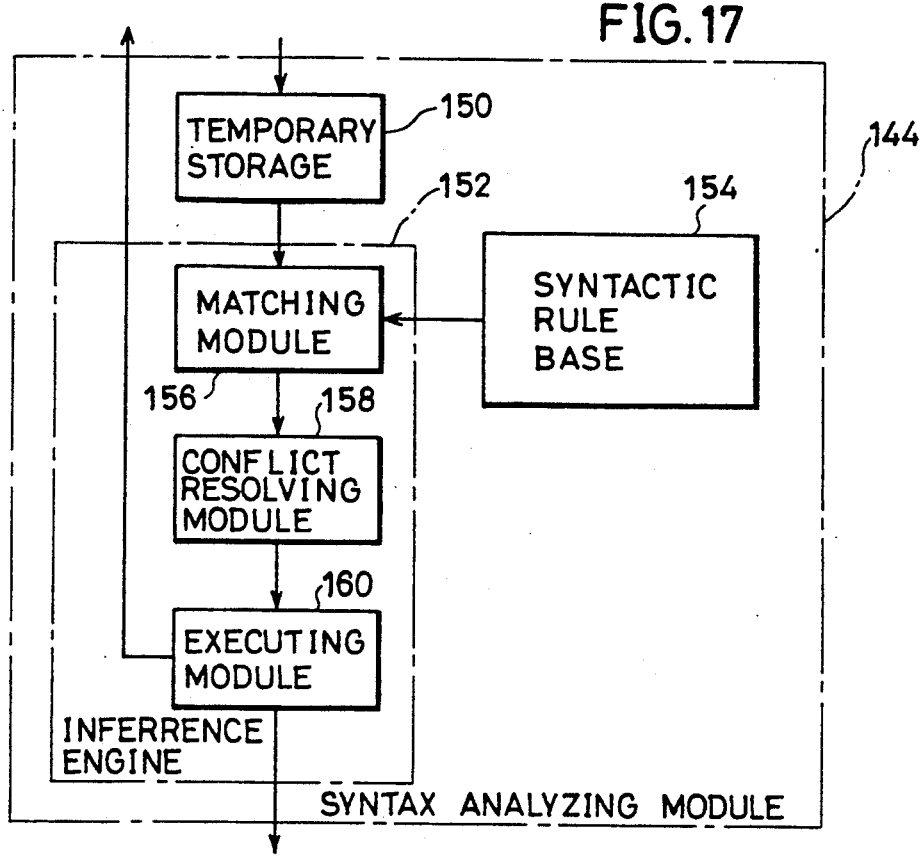
FIG. 17 is a block diagram of a syntax analyzing module.

Referring to FIG. 17, syntax analyzing module 144 comprises a temporary storage 150 for temporarily storing target strings to be processed applied from analysis manager 142, a syntax rule base 154 for storing, in a form usable for the device, rules for determining whether the strings stored in temporary storage 154 are bodies or titles in the document, and an inference engine 152 for inferring whether the strings stored in temporary storage 150 are bodies or titles in the text by referring to the rule, stored in syntax rule base 154.

The inference engine 152 includes a matching module 156 for searching syntactic rule base 154 and for retrieving all the rules applicable to the string stored in temporary storage 150, a conflict resolving module 158 for selecting one rule out of the applicable rules under a predetermined strategy and an executing module 160 for executing an action part (which will be explained later) of the selected rule.

Figures 19, 20:
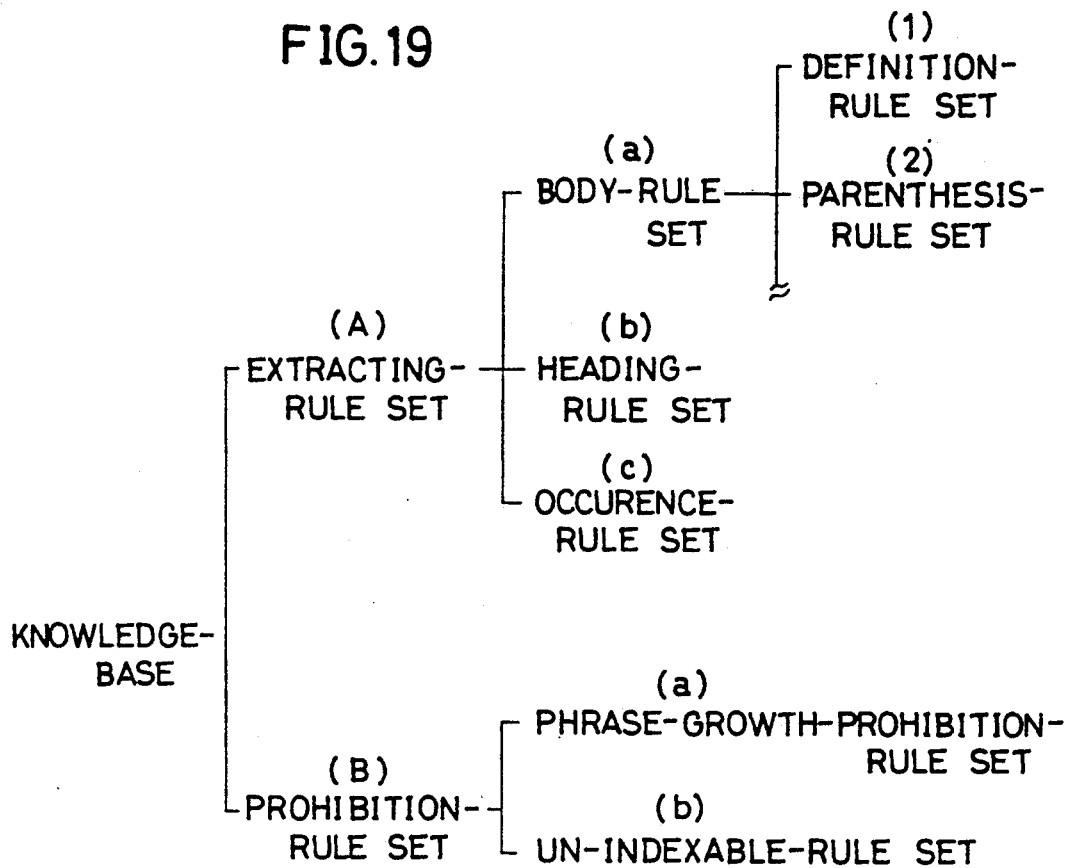
FIG. 19 is a schematic diagram showing a structure of a rule base.
FIG. 20 is a schematic diagram showing an example of a rule for determining sentence.title.

The rule stored in syntax rule base 154 has such a form as shown in FIG. 20. Referring to FIG. 20 (a), each rule comprises a condition part and an action part.

The condition part is for settling conditions that the target string should meet in order that the rule can be applied. The action part describes processings to be executed when the conditions settled in the condition part are satisfied. The specific examples will be described in the following.

Referring to FIG. 20 (b), when a string is a string followed by "." (the condition part), it is determined that the string is a sentence (action part). Similarly, referring to FIG. 20 (c), when the target string is a string followed by "new line" code, it is also determined that the string is a sentence.

When the target string is numeric digits followed by "." and a sentence, it is determined that the target string is a title. Similarly, when the target string is at the head of the text and the length thereof is shorter than that of one line of the text, it is determined that the target string is a title.

Such rules as shown in FIG. 20 are formulations of specialists' knowledge. For example, a title is often described after numeric digits indicative of the numbers of paragraphs or chapters followed by ".". Accordingly, it is determined that the string is a title under the rule shown in FIG. 20 (d). It is also determined that a sentence positioned at the head of the text and shorter than one line of the text is a title (rule (e)).

FIG. 20 shows only the rules for distinguishing between sentences and titles of the text. The reason for such limitation to the rules is that the knowledge base applied in index entry selecting module 148 is classified into two categories, namely, a title and a sentence. If the knowledge base is classified in more detail, it is necessary for the action part of the syntax rule to be described so as to give more detailed definitions.

Figure 17A:
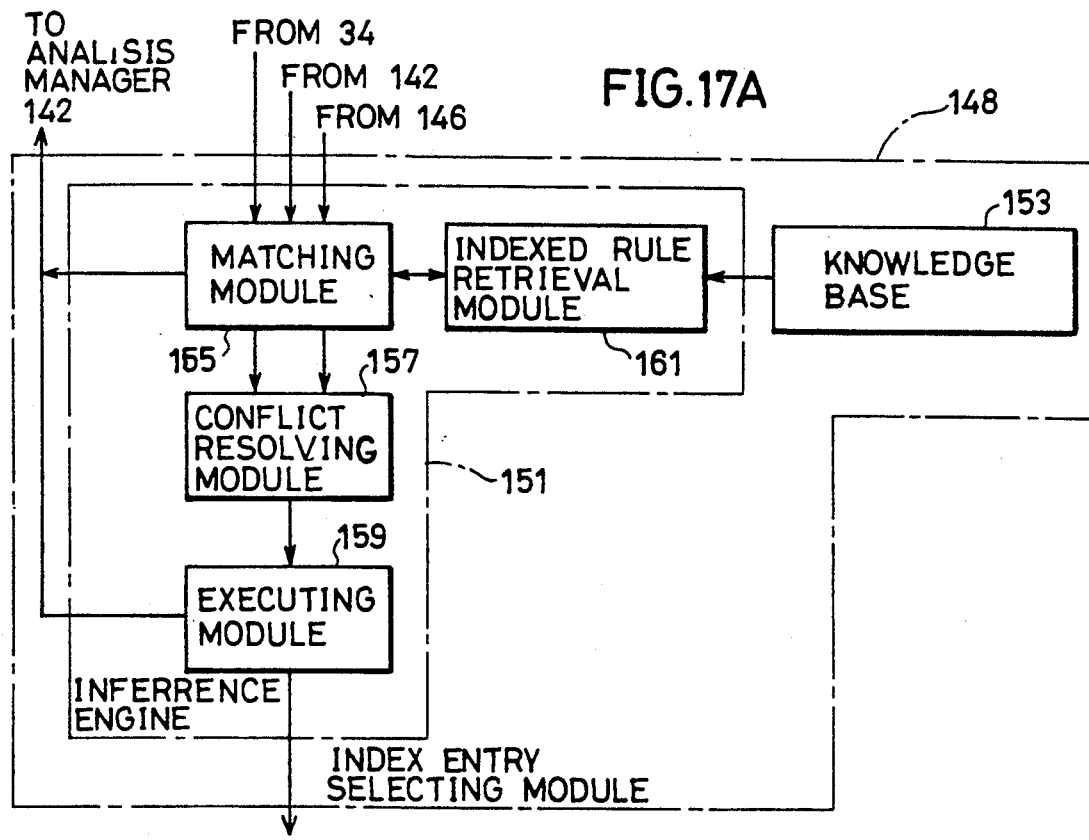
FIG. 17A is a block diagram of an index entry selecting module.

Referring to FIG. 17A, index entry selecting module 148 comprises matching module 155; a knowledge base 153 for storing rules indexed by the information indicative of target categories such as "body" and "title" depending on attributes of the rules, an indexed rule retrieval module 161 for searching knowledge base 153 based on the syntax information applied from matching module 155 to retrieve rules of possible application, a conflict resolving module 157 for receiving a plurality of rules determined to be satisfying the condition part, which rules are retrieved by module 161 and collated with the storage information of morpheme storage 34 by matching module 155, and for selecting one of the conflicting rules based on a prescribed conflict resolving strategy, and an executing module 159 for executing a processing defined in the action part of the rule selected by module 157.

Referring to FIG. 19, the data stored in knowledge base 153 has such a structure as follows. Knowledge base 153 is classified into an extracting rule set (A) and prohibition rule set (B). Extracting rule set (A) is a set of rules for extracting index entries and prohibition rule set (B) is a set of rules for prohibiting adoption of certain words as index entries.

Extracting rule set (A) is classified into a body rule set (a), a heading-rule set (b) and an occurrencerule set (c). Body-rule set (a) is a set of rules applicable to the body of the text. Heading-rule set (b) is a set of rules applicable to a title. Occurrence-rule set (c) is a set of rules for selecting entries based on the number of occurrences of a word.

For example, body-rule set (a) is further classified into a definition-rule set (1) and a parenthesis-rule set (2). Definition-rule set (1) is a set of rules for describing sentence patterns giving definitions to a certain word. The adoption of this rule is based on an experience that a word is relatively important and worth adopting as an entry when a definition thereof is given in the text.

FIG. 22 shows an example of a rule in which sentence patterns giving definitions are described. Referring to FIG. 22 (a), each rule in the definition-rule set has a condition part and an action part. The condition part has conditions described therein to be satisfied by a sentence pattern of a target string when the rule can be applied. A parenthesis < > means that inflexions of the word parenthesized are also allowed. The action part shows processings to be performed when the condition is satisfied.

When such sentence patterns as shown in FIGS. 22 (b)–(e) are established, the word described at the position indicated by "X" in the condition part of each rule is adopted as an entry. The definition-rule set shown in FIG. 22 is collected in the knowledge base and is supplied with an index "body.definition".

Referring to FIG. 19, parenthesis-rule set (2) is a set of rules describing as to whether a word in a parenthesis in the text should be adopted as an entry or not.

Prohibition-rule set (b) is classified into phrase-growth prohibition-rule set (a) and un-indexable-rule set (b), which formulate rules words and phrases should satisfy in order to be adopted as entries. For the purpose of simplicity, only the extracting rules will be described in the present embodiment and no detail description of these prohibition rules will be given here.

Figure 18:
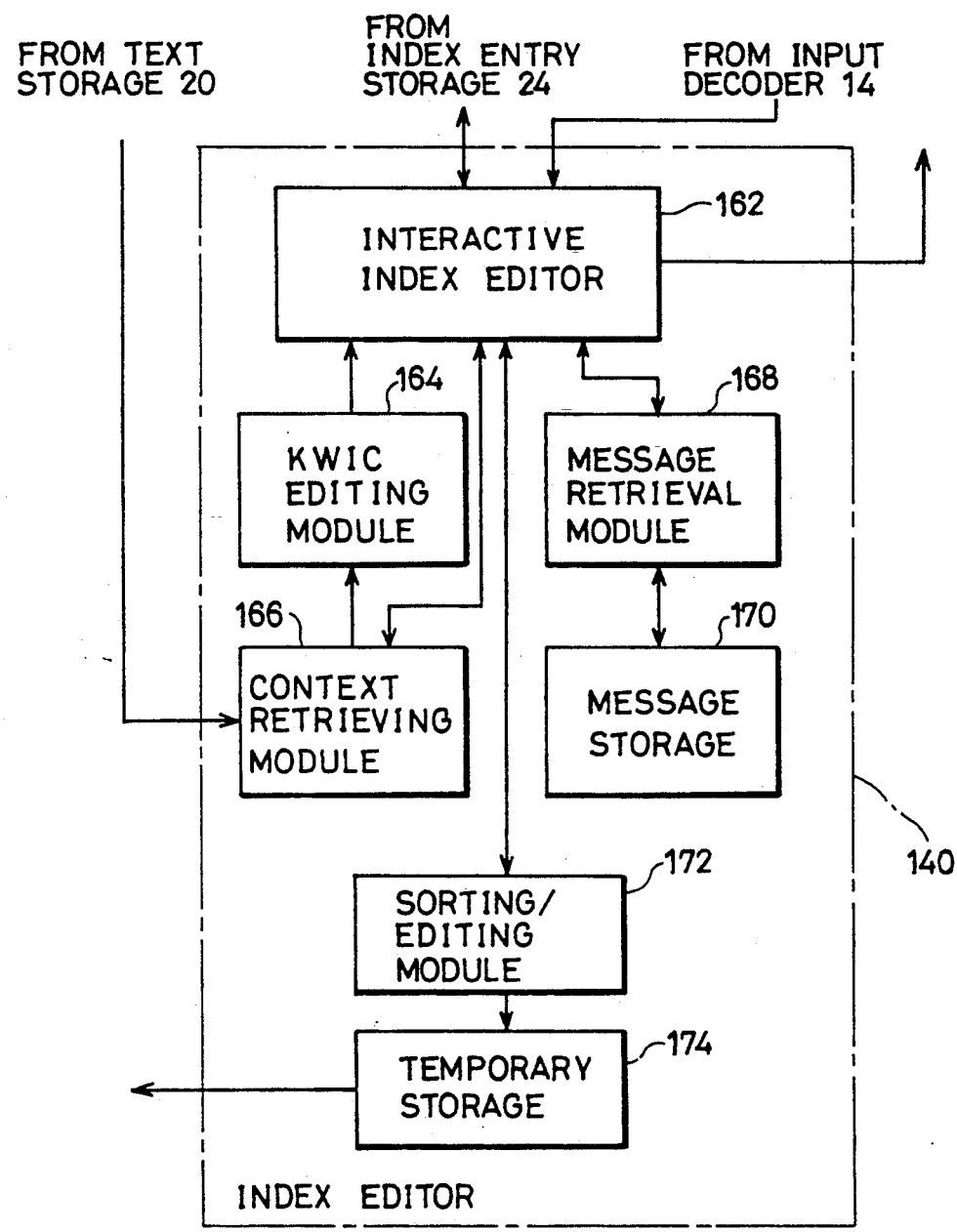
FIG. 18 is a block diagram of an index editor.

Referring to FIG. 18, index editor 140 according to the second embodiment comprises an interactive index editor 162, a context retrieving module 166, a KWIC (KeyWord in Context) editing module 164, a message storage 170, a message retrieving module 168, a sorting/editing module 172 and a temporary storage 174.

Interactive index editor 162 is for editing the index entry list stored in index entry storage 24 through the interaction with the operator by using display unit 8 and keyboard 12.

Context retrieving module 166 is for receiving information regarding a specific entry and an occurrence position thereof in the text from interactive index editor 162, accessing text storage 20 through text editor 18 (FIG. 15) and for retrieving text data in the proximity of the specified occurrence position of the specified entry to apply the same to interactive index editor 162.

KWIC editing module 164 is for editing the specified entry among the block in the text retrieved by context retrieving module 166 in a suitable form for displaying KWIC and applying the edited entry to interactive index editor 162.

Message storage 170 is for storing message to be displayed depending on conditions in the interactive processing by interactive index editor 162. Message retrieving module 168 is for searching message storage 170 in response to the data indicative of the conditions of the processing applied from interactive index editor 162, extracting a message to be displayed and for applying the same to interactive index editor 162.

All the outputs of KWIC editing module 164, context retrieving module 166 and message retrieving module 168 are applied to interactive index editor 162 which displays the information applied therefrom in a prescribed area on an entry editing screen which will be described later.

Sorting/editing module 172 is for sorting the index entry data edited by interactive index editor 162 for the convenience of editing and outputting. When printing is performed, the output of sorting/editing module 172 is temporarily stored in temporary storage 174 and successively applied to printer 10 and is printed. In the case of interactive processing, the data sorted by module 172 is again applied to interactive index editor 162.

Referring to FIGS. 15-27, the apparatus according to the second preferred embodiment of the present invention operates as follows. The example text shown in FIG. 9 is also used in the present embodiment similarly in the first embodiment. For the purpose of simplicity, the operations of the part already described in the first embodiment will not be described here.

Referring to FIG. 17, temporary storage 150 in syntax analyzing module 144 receives one block of the text from analysis manager 142 (FIG. 16) and stores the same. The matching module 156 of inference engine 152 successively inspects the rules included in syntactic rule base 154 to see whether the strings stored in temporary storage 150 satisfy the condition parts of the respective rules.

Suppose that the rules stored in syntactic rule base 154 are only those shown in FIG. 20. Also assume that the first string "TO INPUT INDIVIDUAL KANJI CHARACTER" shown in FIG. 9 is the present target. This string satisfies the condition part of the rule of FIG. 20(c). Accordingly, it is determined that the string is a "sentence".

This string also satisfies the condition part of the rule shown in FIG. 20 (e). According to the rule, it is determined that the string is also a "title", namely, both of the conflicting rules are applicable to the string.

Matching module 156 collates all the rules of syntactic rule base 154 and extracts all the rules applicable to the target string and applies the same to conflict resolving module 158. The action parts of the rules applied to conflict resolving module 158 do not always match with each other. Namely, conflict exists among these applicable rules.

Conflict resolving module 158 resolves this conflict in accordance with the prescribed conflict resolving strategy. With respect to the above-described string "TO INPUT INDIVIDUAL KANJI CHARACTER", for example, conflict resolving module 158 makes the determination that the rule shown in FIG. 20 (e) should be applied rather than FIG. 20 (c). Conflict resolving module 158 gives the selected rule to the executing module 160.

Executing module 160 executes the action part of the rule provided by conflict resolving module 158. Namely, executing module 160 makes the determination that the string "TO INPUT INDIVIDUAL KANJI CHARACTER" is a title and gives the information thereof to syntax information storage 146 (FIG. 16). Syntax information storage 146 stores the information.

Referring to FIG. 21, the data provided by module 160 to syntax information storage 146 has such a structure as follows. A layout 176 of each record of the data includes a page field 178, a line field 180, a start position field 182, an end position field 184 and a collation result field 186.

Page field 178 indicates occurrence pages of the string. Line filed 180 indicates a line position in which the string occurs in the page. Start position field 182 and end position field 184 indicate a start position at which the string starts and a position at which the string ends in the line, respectively. Collation result field 186 stores information (referred to as "syntax information") indicative of a category of the string (for example, a title or a body) and the determination given by executing module 160.

As is apparent from the above description, the record of the syntax information shown in FIG. 21 shows that the string "TO INPUT INDIVIDUAL KANJI CHARACTER", which extends from the first to the 37th letter in the first line on page 1, is a title.

Referring to FIG. 17A, matching module 155 fetches the syntax information stored in syntax information storage 146 and a set of morphemes constituting the string stored in morpheme storage 34. Matching module 155 applies the fetched syntax information to the indexed rule retrieval module 161.

Module 161 searches knowledge base 153, using the given syntax information as an index. In this example, module 161 first searches knowledge base 153, using "title" as an index to find the corresponding rule. When the sentence "TO INPUT INDIVIDUAL KANJI CHARACTER" is a target string, no corresponding rule is included in knowledge base 153. Thus, no entry is extracted from this sentence.

Indexed rule retrieval module 161 communicates to matching module 155 that no applicable rule is found. In response to module 161, module 155 communicates the failure of matching to analysis manager 142.

In response to the failure of matching by matching module 155, analysis manager 142 fetches a string (a sentence) in the subsequent block in the text data stored in text storage 20 and repeats the above-described processings.

In the case of the text shown in FIG. 9, it is not until when it reaches the sentence "The method is called On-Kun Input." in the fifth and sixth lines that the search of knowledge base 153 by indexed rule retrieval module 161 succeeds.

Namely, syntax analyzing module 144 makes the determination that the string belongs to the category of "sentence" by applying the rule shown in FIG. 20 (b). Syntax analyzing module 144 makes a further determination that the string belongs only to the category of "body" from the fact that the rule is not established that the string belongs to the category "title". Syntax analyzing module 144 stores syntax information thereof in syntax information storage 146.

Referring to FIG. 17A, matching module 155 reads this syntax information and gives the same to indexed-rule retrieval module 161. Module 161 searches knowledge base 153, using a word "sentence" as a key. As the rules shown in FIGS. 22(b)-22(e) describe sentence patterns giving "definition" of a "body", these rules are selected by module 161 and given to matching module 155.

Matching module 155 compares the respective rules with the morpheme information stored in morpheme storage 34 and the order of the string and selects the rule of which condition part is satisfied and provides the same to conflict resolving module 157. In this case, only the rule of FIG. 22 (b) is selected and provided to module 157.

Since there exists only one applicable rule, no conflict is caused in this case and, module 157 directly gives the provided rule to executing module 159.

Executing module 159 carries out the processing described in the action part of the given rule. Namely, the determination is made that "On-Kun Input" is appropriate for an entry and the same is adopted as an entry. As a result, the phrase "On-Kun Input" is stored in index entry storage 24 together with the necessary information. Index entry storage 24 is implemented, for example, as a file having a name related to the original text and prepared on a hard disk.

Knowledge-based index entry list generator 138 causes index entry storage 24 to store the index entry data as described above.

Referring to FIG. 23, the index entry data stored in index entry storage 24 has a layout 188 as described in the following. Layout 188 includes as main items, a page field 94, a line field 96, a start position field 98, an end position field 100, an occurrence count field 102, an index entry field 104, an initial letter field 106, an applied rule field 202 and a select/delete flag field 210. The description is already made of page field 94 to initial letter field 106 in the first preferred embodiment with reference to FIG. 11. Therefore, the description will not be repeated here for the purpose of simplicity.

Applied rule field 202 is for storing information specifying the rules of knowledge base 153 applied in selecting the entry. The word "On-Kun Input" indicates that rule 1 (FIG. 22 (b)) among definition rule set (1) of body-rule set (a) is apply.

Select/delete flag field 210 will be described later. Select/delete flag field 210 is filled with "S" when it is outputted from the executing module 159.

Referring to FIG. 18, interactive index editor 162 reads the index entry data stored in index entry storage 24 and provides the same to sorting/editing module 172. Module 172 sorts the applied index entry data in an alphabetical order. As shown in FIG. 24, the sorting result is again stored in index entry storage 24 or in a temporary storage (not shown) in interactive index editor 162.

Interactive index editor 162 displays the sorted entry data on display unit 8 in the format shown in FIG. 25A. The picture displayed on display unit 8 is hereinafter referred to as index entry editing screen.

Referring to FIG. 25A, index entry editing screen 212 is divided into an entry editing table 213 in an upper half of the screen, a file name field 222 for displaying a file name ("AIMS") of a text file being processed and a name of file ("AIMS.ED") wherein the index entry data under processing is stored and a message displaying field 224 for displaying a guide message and the like.

Entry editing table 213 is divided into a select/delete input field 214, an index entry field 216, an initial letter field 218 and a page field 220. Select/delete input field 214 is for designating whether the entry of the line is deleted from the index or not. The symbol "#" in this field means removal of the entry from the index by interactive index editor 162.

Index entry field 216 is for displaying the contents of index entry field 104 shown in FIG. 23. Initial letter field 218 is for displaying the first letter of the entry displayed in index entry field 216. Sometimes the letter displayed herein does not match the first letter of the entry displayed in field 216. In this case, the entry appears in the index under the title classified by field 218, not by field 216. Page field 220 indicates page numbers of occurrences of the entry.

Initial letter field 218 is not always necessary in such a language as English wherein in principle entries are arranged in accordance with the spellings. However, it is employed in such a language as Japanese in which pronunciation of a word displayed as an entry (mostly starting with kanji) can not be uniquely determined from its spelling. Namely, in the Japanese language, the apparatus might erroneously select pronunciation of an entry by an automatic extraction of entries. In Japanese entries are mainly referred to based on pronunciation thereof. If the entries are arranged erroneously, it is very difficult to find the word in the index.

In such a case, by correcting the contents of field 228, the entry words are suitably arranged and the index will be more preferable. Note that in the Japanese language, "hiragana" is basically inputted in this field 228. "Hiragana" is allotted with an internal code according to the alphabetical order. Therefore, the index can be arranged in the order of pronunciation by sorting the entries with their internal codes as a key.

Message displaying field 224 displays an error message or a guide message corresponding to the operations. These message are stored in message storage 170. A message is retrieved by message retrieving module 168 in response to the request from interactive index editor 162 and is given to the editor 162.

With reference to FIG. 26, when "#" is inputted in select/delete input field 214, the letter "S" in the S/D flag field of the entry is replaced by a letter "D". If S/D flag field 210 is filled with "D", the entry is removed from the index when printing. Or such an entry is deleted when rewritten in the file. Conversely, if S/D flag field 210 of an entry is filled with the letter "D", the symbol "#" is displayed in select/delete field 214 of the entry when displayed on index entry editing screen 212.

The operation of inputting "#" in field 214 is communicated to interactive index editor 162, for example, by moving a cursor to the corresponding field and pressing the key "#" of keyboard 12 (FIG. 15) or hitting a specific function key (a function key F2, for example) when the line including the corresponding entry is processed. When canceling the deletion of the entry, it is necessary to replace "#" by a space or to press function key F2 once again during the processing of the line.

The cursor can be moved by striking an arrow key as indicated in the guide message shown in FIG. 25A. In using the mouse, one should position the mouse pointer in a desired field and "click" to set the cursor to the field.

Referring to FIG. 25A, page field 220 shows occurrence pages of the entry, which is of great importance in the index. In principle, the revision of the contents of field 220 is not allowed for the purpose of accuracy. The only exceptions are when the entry itself is corrected or when a new entry is added.

The apparatus is characterized in that when index entry editing screen 212 is displayed, it is possible to verify how an entry in the line now processed is used in the text by striking the function key F1. For example, suppose that the function key F1 is pressed when the cursor is placed in the line of "Translation" in FIG. 25A.

Referring to FIG. 18, interactive index editor 162 provides the information indicative of the selected entry and the occurrence position thereof to context retrieving module 166. This information is obtained from the data of the index entry storage 24 shown in FIG. 24.

Context retrieving module 166 refers to text storage 20 through text editor 18, extracts a part of the textual data in the proximity of the occurrence of the entry and applies the same to interactive index editor 162. Module 166 also gives the sentence where the entry occurs to KWIC editing module 164. Module 164 edits the given sentence such that the retrieved entry is located at a prescribed position and the entry is emphasized by an underline or a video-inversion, and the gives edited sentence to interactive index editor 162.

Referring to FIG. 25B, interactive index editor 162 displays KWIC display screen 226. The target index is displayed at the upper left corner of KWIC screen 226. Displayed at the upper right corner is the information indicative of the number of all the occurrences of the entry in the text data and the order of occurrences of entry now being displayed. FIG. 25B shows the display of the first occurrence of the word "Translation" which occurs twice in the text.

The data from the KWIC editing module 164 is displayed in a KWIC display line 232 of the information in KWIC display screen 226. In an ordinary KWIC display, only a part of the text which can be displayed in one line of the display screen is displayed such that the target entry is placed at the center of the line. Referring to FIG. 25B, the retrieved entry "Translation" is emphasized by the underline.

Displayed in a context display field 234 of KWIC display screen 226 is the part of the body of the text data retrieved by context retrieving module 166. The text is arranged such that the retrieved entry is displayed in the third line. The entry are emphasized by an underline, a video-inversion or the like.

Provision of KWIC display line 232 and context display field 234 facilitates the determination of the importance of entries. As a result, when there are a plurality of the same entries, the selection of an occurrence position giving much information and deletion of entries of less importance from the index can be easily performed without mistake.

A message display field 236 of KWIC display screen 226 displays the appropriate messages retrieved from message storage 170 by interactive index editor 162 and message retrieving module 168.

When the selection of necessary entries is finished, interactive index editor 162 updates the storage contents of index entry storage 24 by corrected data. As a result, when an entry "Window", for example, is deleted, "D" is written in S/D flag field 210 of the record of "Window" out of the index data stored in index entry storage 24, as shown in FIG. 26.

Sorting/editing module 172 later reads, sorts and edits the index entry data of index entry storage 24 by request and gives the edited data to temporary storage 174. The data stored in temporary storage 174 is successively given to printer 10. Printer 10 prints index 28 on the paper.

The entry "Window" is deleted from the entry data shown in FIG. 26. As a result, the obtained index does not contain the entry "Window", as shown in FIG. 27 (see FIG. 12).

As the foregoing, according to the second embodiment, an index can be automatically created in a short time by using knowledge base for extracting entries. In addition, the final verification can be done by the interaction between an operator and the apparatus, so that an accurate index can be efficiently created. Besides, context wherein entries occur can be easily referred to in editing the index. Thus, editing for the selection of entries can be very rapidly and easily performed, resulting in an accurate index.

In practice, the above-described apparatus according to the second embodiment can be also implemented by the program executed in CPU 116 or the like by using the computer system shown in FIG. 13.

Figure 28:
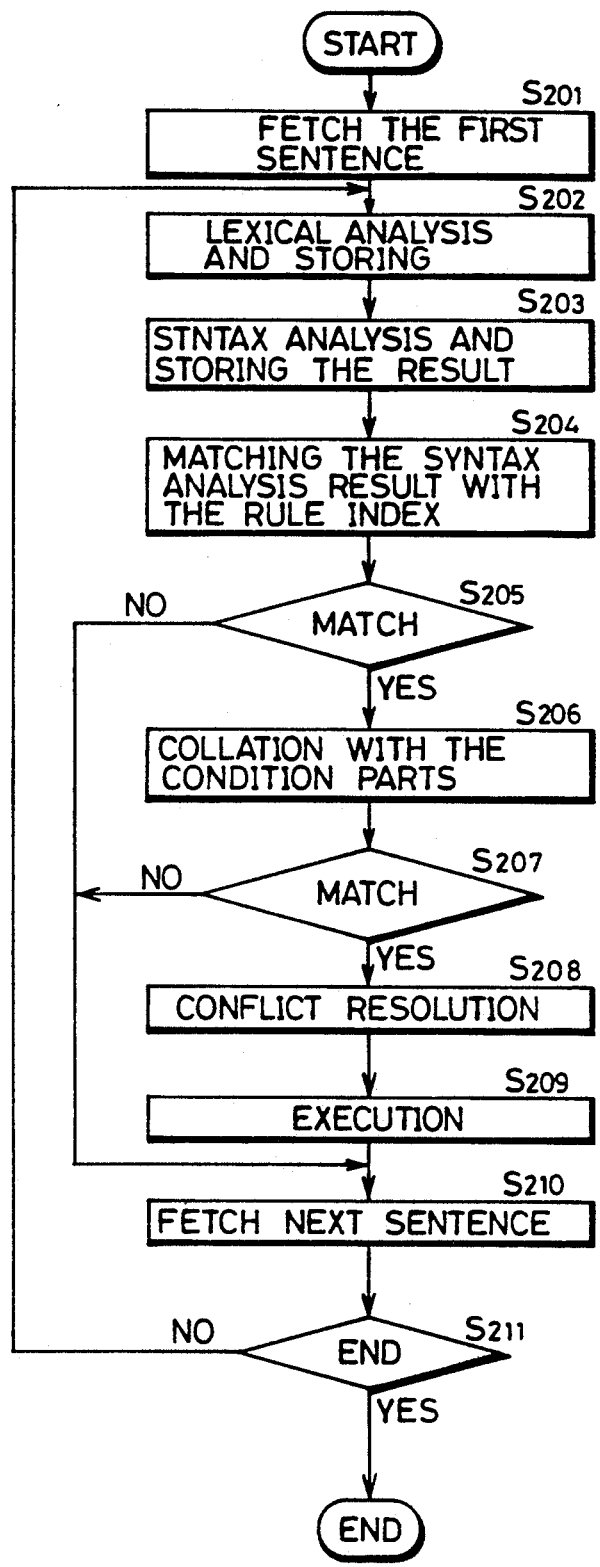
FIG. 28 is a flow chart of a part of the program for the apparatus according to the second embodiment implemented by the computer.

Referring to FIG. 28, the flow chart of the portion extracting entries based on knowledge base in the program executed in CPU 116 has the following control structure. The extraction is carried out by knowledge-based index entry list generator 138.

In step S201, the first sentence is fetched.

In step S202, morphological analysis is carried out for the fetched sentence and the result thereof is stored in morpheme storage 34 (FIG. 16).

In step S203, syntax analysis is carried out for the sentence and the result thereof is stored in syntax information storage 146 (FIG. 16).

In step S204, the index of the rule stored in knowledge base 153 (FIG. 17A) is collated with property of the target sentence indicated by the syntax information.

In step S205, the determination is made as to whether knowledge base 153 includes a rule set having an index matching the syntax information or not. If the answer of the determination is YES, the control proceeds to step S206. If not, the control proceeds to step S210.

In step S206, each condition part of the rule set found in knowledge base 153 is collated with morphemes and spellings of the target sentence.

In step S207, the determination is made as to whether or not there exists a rule whose condition part is satisfied. If the answer of the determination is YES, the control proceeds to step S208. If not, the control proceeds to step S210.

In step S208, conflict is resolved between a plurality of applicable rules. This resolution is carried out in accordance with a prescribed conflict resolving strategy as described above.

In step S209, the action part of selected one rule is executed. More specifically, when the rule included in the rule set of the above-described "body.definition" (FIG. 22) is selected, "X" is selected as an entry. The selected entry is stored in index entry storage 24 (FIG. 15).

In step S210, the next sentence in the text data is fetched.

In step S211, the determination is made as to whether the fetch of the next sentence succeeds or not. When the fetch succeeds, the control returns to step S202 to repeat a series of processings. When the fetch fails, that is, when there exists no more sentence, the text data has come to its end and the program ends.

Knowledge-based index entry list generator 138 (FIG. 15) can be implemented by using such program as having the control structure shown in FIG. 28.

Figure 29:
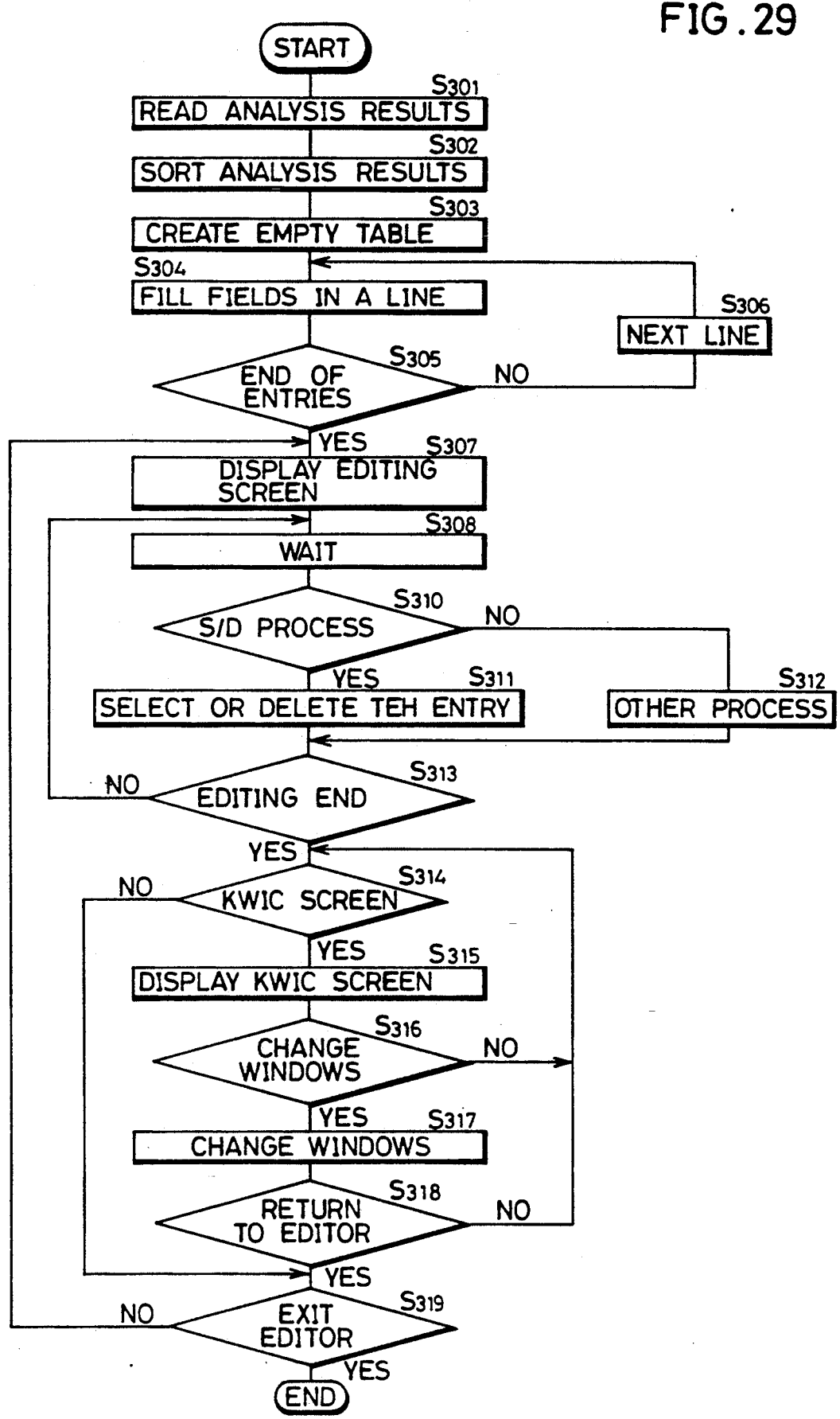
FIG. 29 is a flow chart of a part of the program for the apparatus according to the second embodiment implemental by the computer.

Referring to FIG. 29, the routine for executing the function corresponding to interactive index editor 162 (FIG. 18) has the following control structure.

In step S301, the index entry data stored in index entry storage 24 (FIG. 15) is fetched.

In step S302, the index entry data is alphabetically sorted. This sorting is carried out by sorting/editing module 172 of FIG. 18. The result is returned to interactive index editor 162.

In step S303, an empty entry editing table such as shown in FIG. 25A is created. This table is created by previously preparing fixed data constituting the table in storing means and reading the same.

In step S304, each field of one line of the created table is filled with the information corresponding to the index entry information.

In step S305, the determination is made as to whether the entry information has come to its end or not. If the answer of the determination is YES, the control proceeds to step S307 and if not, the control proceeds to step S306.

In step S306, the number of lines of the table is incremented by one. After the line number is incremented, the control returns to step S304. All the entry information is written in the table by repeating the processings in steps S304, S305 and S306.

In step S307, index entry editing screen 212 shown in FIG. 25A is displayed on display unit 8 (FIG. 15). Entry editing table 213 of index entry editing screen 212 displays the index entry information.

In step S308, the program waits for the input by the operator.

When input is made by the operator, the control proceeds to S310. In step S310, the determination is made as to whether the operator designates the selection/deletion processing or not. If the answer of the determination is YES, the control proceeds to step S311 and if not, the control proceeds to step S312.

In step S311, selecting or deleting the entry is carried out. This processing is carried out by writing "S" or "D" in select/delete flag field of the index entry information, as shown in FIG. 26.

In step S312, various processings are carried out in accordance with the selection by the operator. Any of these processings includes updating each field of the data shown in FIG. 26 in response to the input by the operator using keyboard 12 (FIG. 15) and refreshing the information displayed on screen 212 in accordance with the updated data. The technique to update the state of the computer system in accordance with the input by the operator is well known in this field of the art. Therefore, no detailed description thereof is given here.

When step S311 or S312 is completed, control proceeds to step S313. In step S313, the determination is made whether the editing is terminated or not. If the answer is NO, the control returns to S308. Else the control proceeds to step S314.

In step S314, the program waits for the input by the operator. The control proceeds to step S315 upon the operation of keyboard 12 (FIG. 15) by the operator.

In step S315, the determination is made as to whether or not the key depressed by the operator is a function key instructing KWIC screen display. If the answer is NO, the control proceeds to S319 and if not, the control proceeds to step S315.

In step S315, the KWIC screen is displayed in the format as shown in FIG. 25B with respect to the index entry being processed. The program puts itself into a waiting state after the screen is displayed. At the beginning of the display of the KWIC display screen 226, the cursor is positioned at the head of KWIC display line 232.

When some key is input during the display of KWIC display screen 226, the control proceeds to step S316. In step S316, the determination is made as to whether the key input means the request for changing the screen or not. As displayed in message display field 236 of FIG. 25B, the program is informed of this request for changing the screen by depressing, for example, "function +arrow key". When screen change is requested, the control proceeds to step S317 and if not, the control returns to step S314.

In step S317, the object window is changed at the request for the screen change. For example, if the "function $+\theta$" key is depressed when the cursor is positioned in KWIC display line 232, the cursor moves to context display field 234. Context display field 234 displays the sentences of the body such that the position of the entry comes in the third line from the top of the context display field. In this case, context display field 234 can function as a screen editor.

In the field 234, the target entry for retrieval is underlined or inverted for emphasis. Such an emphasis can be achieved by using fields 94-100 of FIG. 26.

If "function + ↑" is stricken when the cursor is positioned in KWIC display line 232, the cursor moves to index entry field 228. The field 228 ordinarily displays an index entry being processed. However, this entry can be changed to other string by request. In such a case, the changed string can be retrieved in the body. The information in an occurrence count field frequency 230 can be displayed by using the field 102 of FIG. 26.

The occurrence position of the next entry can be displayed by striking a "translation/next" key.

The operator can find the importance of the index entry in the context by referring to KWIC display screen 226 such as shown in FIG. 25B. Thus, the operator can select those considered to be important among the index entries and delete the others from the index.

As the foregoing, the screen change among index entry field 228, KWIC display line 232 and context display field 234 is carried out in step S317.

In step S318, the determination is made as to whether the control is returned to the editor or not. This determination can be made, for example, by testing whether a specific function key indicating the end of KWIC screen is stricken or not during the display of KWIC display screen 226. If the answer of the determination in step S318 is NO, the control proceeds to step S314 to repeat the KWIC display processing. If the answer of the determination is YES, the control proceeds to step S319.

In step S319, the determination is made as to whether the processing of the index editor itself should be terminated or not. This determination is made by testing whether the key depressed at the end of the KWIC display screen is the specific function key also meaning the end of the editor or not. If the answer of the determination is NO, the control proceeds to step S307 to further repeat a series of index entry editing processings. If the answer of the determination is YES, the program ends.

As the foregoing, the automatic index creating apparatus according to the second preferred embodiment of the present invention can be implemented by a computer system. As is well known, the computer program has high flexibility and can implement the same purpose by different combinations of instructions. The above-described program flow chart is one example and therefore functions required of the apparatus according to the present invention can be implemented by a program having other control structure.

In addition, the display screens are not overlapped with each other in the above embodiments. However, the present invention can be implemented with a plurality of windows with the positions and the sizes thereof changed or by a window system wherein the windows are overlapped with each other. In the above-described embodiments, the guide messages and the like are always displayed in the screen. However, the present invention is not limited thereto. It can be implemented with pull-down menus, for example.

As the foregoing, the present invention allows automatic creation of index entry information by using a knowledge base wherein specialists' rules are stored in the form interpretable for the machine. It is also possible to edit the once created index entry information by an interactive processing. Importance of an entry in a body can be easily verified by using the same screen during editing.

Accordingly, an index can be created on fixed criteria irrespective of skill of an operator. Since selection of entries can be easily made during editing of the index, the time required for completing the index can be shortened. Since entries can be deleted, the index can be created taking into consideration such limitations as the upper bound of number of entries for index. In addition, since extraction of entries from a text is carried out by a computer, no error such as transcription error occurs.

What is more advantageous is that a temporary index can be created by using this apparatus even in the course of creating the document. In addition, since specialists' knowledge is stored in a knowledge base, the knowledge and experience for creating the index can be shared by all the operators. Furthermore, since the same knowledge base is used in extracting entries, irregularity of criteria for extracting entries caused by different operators can be prevented.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for creating an index of coded textual data, comprising:
   textual data storing means for storing coded textual data;
   text analyzing means for dividing said coded textual data into meaningful strings of words, characters, symbols, or control codes;
   specialized word storing means for storing a set of specialized words pertaining to a field of knowledge related to said coded textual data;
   entry selecting means for selecting an index entries only those strings that match a word or its substantial equivalent in said set of specialized words and creating index entry data by associating and storing each of the selected strings with each position in said coded textual data where that selected string occurs; and
   index outputting means for outputting in visible form an index of said coded textual data by arranging said index entries in a prescribed order and outputting the arranged index entries together with symbols indicative of their associated positions of occurrence in said coded textual data.

2. The apparatus according to claim 1, wherein said entry selecting means comprises:
   match detecting means for detecting whether or not a match occurs between one of said specialized words and each string, wherein said entry selecting means selects matched words as index entries.

3. The apparatus according to claim 2, wherein
   said specialized word storing means stores variant information for generating a possible variant that is substantially equivalent to at least one of said specialized words;
   said entry selecting means includes:
      variant generating means, responsive to a mismatch detected by said match detecting means, for generating a variant for a word referred to among said set of specialized words based on said variant information stored in said specialized word storing means, and
      means for comparing said generated variant with said strings and selecting a string that matches one of said generated variants as an index entry.

4. The apparatus according to claim 2, wherein
   said specialized word storing means stores said specialized words in such a manner that said specialized words can be read out in a prescribed order,
   said match detecting means includes means for comparing each of said strings with said specialized words in said prescribed order to detect a match.

5. The apparatus according to claim 1, further comprising:
   entry editing means for editing said index entries stored in said entry selecting means in accordance with an externally applied instruction.

6. The apparatus according to claim 5, wherein said entry editing means comprises:
- encoding means responsive to a manual operation for encoding combinations of manual key operations into input signals,
- decoding means for receiving and decoding combinations of sad input signals to specify target index entry data to be processed, and
- index entry data processing means for performing processing tasks specified by said decoding means for the index entry data specified by said decoding means.

7. The apparatus according to claim 6, wherein said entry editing means further comprises:
- retrieving means responsive to the index entry specified by said decoding means for searching said coded textual data to determine where said specified index entry occurs in said coded textual data, and
- displaying means for displaying textual data retrieved by said retrieving means.

8. The apparatus according to claim 2, wherein said entry selecting means further includes:
- morphological analyzing means for dividing each string received from said text analyzing means into morphemes, and
- means for storing said morphemes,
- wherein said match detecting means detects whether or not a match occurs between a morpheme and one of said specialized words.

9. The apparatus according to claim 8, wherein said morphological analyzing means includes:
- a morphemes dictionary for storing morphemes in a particular language, and
- a comparison means for comparing each string with said morphemes.

10. The apparatus according to claim 1, wherein said specialized word storing means includes inflections and variants which are substantially equivalent to that entry.

11. The apparatus according to claim 1, wherein said string is compared to a standard word entry in said specialized word storing means, and if no match is found, each string is compared to inflections and variants of the standard word entry.

12. An apparatus for creating an index of coded textual data, comprising:
- textual data storing means for storing coded textual data;
- text analyzing means for dividing said coded textual data into meaningful strings of words, characters, symbols or control codes;
- rule storing means for storing rules for selecting index entries from said textual data;
- entry selecting means for selecting strings as index entries, creating index entry data, and storing said index entry data along with each position in said coded textual data where an associated one of said selected strings occurs in accordance with said rules; and
- index outputting means for outputting in visible form an index of said coded textual data by arranging said index entries in a prescribed order and outputting the arranged index entries together with symbols indicative of their associated positions of occurrence in said textual data.

13. The apparatus according to claim 8, wherein each of said rules for selecting index entries includes:
- a condition part for establishing a specific arrangement of strings as a condition; and
- an action part for indicating a processing task to be performed when said condition established by said condition part is satisfied, said action part indicating which string in said specified arrangement is to be selected as an index entry.

14. The apparatus according to claim 13, wherein said entry selecting means comprises:
- text arrangement analyzing means for analyzing the arrangement of said coded textual data, dividing said coded textual data into partial texts, each partial text belonging to one of a plurality of different categories, and relating one of said categories to each of said partial texts;
- means for dividing said partial texts into individual sentences in accordance with a prescribed rule, each sentence being a set of strings obtained by said text analyzing means;
- rule retrieving means for retrieving rules from said rule storing means applicable in each of said categories for each of said sentences;
- means for comparing said condition part of one of said retrieved rules with said sentence and detecting when the condition described in said condition part is satisfied, and
- string selecting means responsive to the detection of satisfaction of the condition for performing processing indicated by the acting part of said retrieved rule to select a specific string in said sentence as an index entry.

15. The apparatus according to claim 14, wherein said text arrangement analyzing means comprises:
- text dividing rule storing means for storing text dividing rules required for dividing the textual data into partial texts, each of said text dividing rules establishing a category for each of said partial texts; and
- means for storing said category with an associated text dividing rule.

16. The apparatus according to claim 15, wherein said coded textual data includes a control code for controlling text format and a punctuation mark, and each of said text dividing rules includes:
- a condition part for establishing a specific arrangement of said control code, said punctuation mark, and said string as a condition,
- an action part for determining a processing task to be performed when the condition established in said condition part of said text dividing rules is satisfied, said action part defining which among the arrangement of said control code, said punctuation mark, and said string determines the end of a partial text, the beginning of a partial text, and to which category a partial text belongs.

17. The apparatus according to claim 16, wherein said text arrangement analyzing means comprises,
- means for detecting satisfaction of the condition part of said text dividing rule by sensing an arrangement of the control code, punctuation mark, and string of said coded textual data,
- means responsive to the detection of the satisfaction of the condition part of said text dividing rules for performing the processing task determined by the acting part of said text dividing rule, dividing said coded textual data into partial texts, and determining which category said divided partial text belongs to.

18. The apparatus according to claim 12, wherein said entry editing means comprises:
   encoding means responsive to a manual operation for encoding a combination of manual key operations into input signals,
   decoding means for receiving and decoding combination of input signals to specify target entry data, and
   index entry data processing means for performing processing tasks specified by said decoding means for the index entry data specified by said decoding means.

19. The apparatus according to claim 18, wherein said entry editing means further includes:
   retrieving means responsive to an index entry specified by said decoding means for searching said coded textual data to detect the positions where said specified index entry occurs, and
   displaying means for displaying said textual data retrieved by said retrieving means.

20. The apparatus according to claim 13, further comprising:
   applied rule storing means for storing information specifying an index entry selecting rule whose condition is satisfied, said information being associated with the index entry selected in response to said condition being satisfied, and
   displaying means for displaying the contents of said applied rule storing means together with said index entry.

* * * * *